United States Patent
Terao et al.

(10) Patent No.: US 6,174,648 B1
(45) Date of Patent: Jan. 16, 2001

(54) OPTICAL FILTER FABRICATION METHOD USING FIBER HOLDER WITH SPIRAL GROOVE AND PHASE MASK WITH SPIRAL DIFFRACTION GRATING

(75) Inventors: Yoshitaka Terao; Tsutomu Nomoto; Akihiko Nishiki, all of Tokyo (JP)

(73) Assignee: Oki Electric Industry Co., Ltd., Tokyo (JP)

(*) Notice: Under 35 U.S.C. 154(b), the term of this patent shall be extended for 0 days.

(21) Appl. No.: 09/109,904

(22) Filed: Jul. 2, 1998

(30) Foreign Application Priority Data

| Jul. 8, 1997 | (JP) | 9-182750 |
|---|---|---|
| Aug. 8, 1997 | (JP) | 9-215227 |
| Aug. 8, 1997 | (JP) | 9-215228 |
| Oct. 31, 1997 | (JP) | 9-301302 |

(51) Int. Cl.⁷ .................. G03C 5/00; G03F 9/00
(52) U.S. Cl. .................. 430/321; 430/5; 359/855
(58) Field of Search .............. 430/321, 5; 359/855, 359/577, 578, 580, 589, 619, 628, 558, 559, 563, 566, 569, 570, 571, 572, 573, 885, 891; 356/399, 400, 401, 416; 65/376, 377, 378; 385/15, 27, 28, 37

(56) References Cited

U.S. PATENT DOCUMENTS

| 5,359,687 | * | 10/1994 | McFarland et al. | 385/49 |
|---|---|---|---|---|
| 5,367,588 | | 11/1994 | Hill et al. | 385/37 |
| 5,372,916 | * | 12/1994 | Ogawa et al. | 430/321 |
| 5,620,495 | * | 4/1997 | Aspell et al. | 65/392 |
| 5,760,910 | * | 6/1998 | Lepper, Jr. et al. | 356/416 |
| 5,868,952 | * | 2/1999 | Hatakeyama et al. | 216/66 |
| 5,881,186 | * | 3/1999 | Starodubov | 385/37 |
| 5,945,261 | * | 8/1999 | Rourke | 430/321 |

OTHER PUBLICATIONS

Anderson et al., "Production of in–fibre gratings using a diffractive optical element", Electronics Letters, vol. 29, No. 6, Mar. 18, 1993, pp. 566–568.

Malo et al., "Apodised in–fibre Bragg grating reflectors photo–imprinted using a phase mask", Electronics Letters, vol. 31, No. 3, Feb. 2, 1995, pp. 223–225.

Inoue et al., Fiber Bragg grating and its applications, Oyo Butsuri, vol. 66, No. 1, 1997, pp. 33–36.

* cited by examiner

Primary Examiner—Christopher G. Young
Assistant Examiner—Saleha R. Mohamedolla
(74) Attorney, Agent, or Firm—Venable; Robert J. Frank

(57) ABSTRACT

An optical filter is manufactured by placing a photosensitive optical fiber in a spiral arrangement on a fiber holder, preferably having a spiral groove for holding the fiber, and exposing the fiber to ultraviolet light through a phase mask having a spiral diffraction grating, forming an in-fiber Bragg grating. The fiber can be conveniently scanned by an ultraviolet beam as the fiber holder and phase mask turn on a rotating stage. The fiber can be compactly packaged between the fiber holder and a cover. The fiber holder and cover can be formed by coating a substrate with layers of polymer material, the spiral groove being formed by photolithographic patterning of one of the layers.

32 Claims, 24 Drawing Sheets

OPTICAL FILTER FABRICATION METHOD USING FIBER HOLDER WITH SPIRAL GROOVE AND PHASE MASK WITH SPIRAL DIFFRACTION GRATING

BACKGROUND OF THE INVENTION

The present invention relates to an optical filter comprising a Bragg grating formed in an optical fiber, to a method and apparatus for manufacturing such a filter, and to a fiber holder and phase mask used in the manufacturing process.

In-fiber Bragg gratings, also known simply as fiber Bragg gratings or FBGs, are useful in the field of optical communication as optical filters for such purposes as wavelength-division multiplexing and dispersion compensation. U.S. Pat. No. 5,367,588 describes a method of manufacturing an in-fiber Bragg grating by exposing a photosensitive optical fiber to ultraviolet light through a phase grating mask. The phase grating mask comprises a quartz glass plate, which is transparent to ultraviolet light, having a periodic relief pattern of parallel corrugations on one surface. The corrugations have the form of, for example, parallel channels with a rectangular cross section. Diffraction in the phase mask modulates the intensity of the emerging ultraviolet light with a periodicity determined by the grating spacing or pitch.

The photosensitive optical fiber is placed in contact or near-contact with the phase grating mask, in a direction orthogonal to the corrugations. Exposure to the ultraviolet light changes the refractive index of the core of the fiber, imprinting an index modulation in the fiber core with the same periodicity as that of the phase grating mask. This index modulation constitutes the Bragg grating.

A chirped Bragg grating can be formed by modulating the grating pitch of the phase grating mask. An apodized Bragg grating can be formed by modulating the strength of the ultraviolet light along the length of the optical fiber.

The phase grating mask can be fabricated by reactive ion etching of a fused quartz substrate, as described, for example, on page 567 of Electronics Letters, Vol. 29, No. 6 (Mar. 18, 1993).

Filter performance parameters such as the reflection bandwidth and the top flatness of the reflection spectrum are known to depend on the length of the imprinted grating. When an in-fiber Bragg grating is used for dispersion compensation, for example, the reflection bandwidth $\Delta\lambda$ is given by the following formula, in which L is the length of the Bragg grating, c is the speed of light, and D is the dispersion value.

$$\Delta\lambda = 2L/(cD)$$

This formula indicates that for a given dispersion D, the reflection bandwidth $\Delta\lambda$ increases in proportion to the grating length L.

Long in-fiber Bragg gratings are not easily fabricated with a phase grating mask of the type described above, however, because the size of the phase grating mask is limited by the need to form the phase grating mask itself in a vacuum chamber. A step-and-repeat process can be carried out by moving the fiber past the phase grating mask, but this process is time-consuming and requires extremely accurate alignment from one step to the next. For these reasons, the length of in-fiber Bragg gratings formed by use of conventional phase grating masks has been limited to a maximum of about one hundred millimeters (100 mm).

The limited length of the conventional phase grating mask is thus an obstacle to the attainment of wide reflection bandwidths and other desirable filter characteristics. The limited length is also an obstacle to effective apodization of the in-fiber Bragg grating.

A further obstacle to the use of long in-fiber Bragg gratings is the need to package the fiber containing the grating in such a way as to protect the grating from temperature variations and other external effects. Conventional packaging processes cannot easily be applied to long lengths of fiber.

SUMMARY OF THE INVENTION

It is accordingly an object of the present invention to manufacture an optical filter having an in-fiber Bragg grating longer than one hundred millimeters.

Another object is to provide apparatus for manufacturing such an optical filter.

Another object is to provide a fiber holder useful in the manufacture of such an optical filter.

Another object is to provide a phase mask useful in the manufacture of such an optical filter.

Another object of the invention is to manufacture an optical filter having a highly accurate in-fiber Bragg grating.

Another object is to manufacture an optical filter having an apodized in-fiber Bragg grating longer than one hundred millimeters.

Another object is to manufacture an optical filter having a chirped in-fiber Bragg grating longer than one hundred millimeters.

Another object is to provide an efficiently packaged optical filter.

Another object is to provide a compactly packaged optical filter.

Another object is to provide a well-protected optical filter.

The invented method of manufacturing an optical filter comprises the steps of:

securing an optical fiber having a photosensitive core in a flat spiral arrangement on the upper surface of a fiber holder;

placing a phase mask parallel to the upper surface of the fiber holder, the lower surface of the phase mask having a spiral diffraction grating facing the optical fiber; and exposing the optical fiber to ultraviolet light through the phase mask, thereby creating an in-fiber Bragg grating.

The step of exposing is preferably carried out by rotating the fiber holder and phase mask while radially scanning the phase mask with an ultraviolet beam, the scanning being synchronized with the rotation so that the beam follows the spiral arrangement of the optical fiber.

The invented fiber holder comprises a flat plate having a spiral groove for holding the photosensitive optical fiber.

The invented phase mask comprises a plate transparent to ultraviolet light, having a spiral pattern of periodic pits on one surface.

The invented apparatus for manufacturing an optical filter comprises the invented fiber holder, the invented phase mask, a rotating stage supporting the fiber holder and phase mask, and an optical system for illuminating the photosensitive optical fiber with ultraviolet light through the phase mask.

The invented optical filter comprises the invented fiber holder, and an optical fiber with a periodically modulated refractive index, held in the spiral groove.

In-fiber Bragg gratings up to at least about four meters in length can be manufactured by the invented method, using a fiber holder and phase mask having the form of five-inch discs. The fiber holder and phase mask can be fabricated using equipment of the type conventionally used for processing semiconductor wafers.

An accurate in-fiber Bragg grating can be produced because a continuous manufacturing process is employed, rather than a step-and-repeat process.

An apodized in-fiber Bragg grating is formed by varying the amount of ultraviolet light to which the optical fiber is exposed according to position on the upper surface of the fiber holder. If the phase mask is scanned by an ultraviolet beam, the amount of ultraviolet light can be varied by using a pulsed light source and varying the pulse repetition rate. Alternatively, a variable optical attenuator can be employed, or the rotational speed of the fiber holder can be varied.

A chirped in-fiber Bragg grating is formed by dividing the phase mask concentrically into zones, and varying the spacing of the pits in the spiral diffraction grating from zone to zone.

The in-fiber Bragg grating can be efficiently packaged between the invented fiber holder and a cover. The cover may also have a spiral groove.

The cover can be formed by applying a protective layer to the fiber holder and optical fiber after formation of the in-fiber Bragg grating. The fiber holder can be formed by patterning a polymer layer disposed on a substrate, creating a spiral groove in the polymer layer. Alternatively, a polymer layer can be patterned to form a dummy fiber, a polymer protective layer can be applied around the dummy fiber, and then the dummy fiber can be removed, leaving a spiral groove in the polymer protective layer. A polymer protective underlayer may also be applied to the substrate. A compact, well-protected optical filter module can be manufactured in this way.

DETAILED DESCRIPTION OF THE INVENTION

Figure 1:
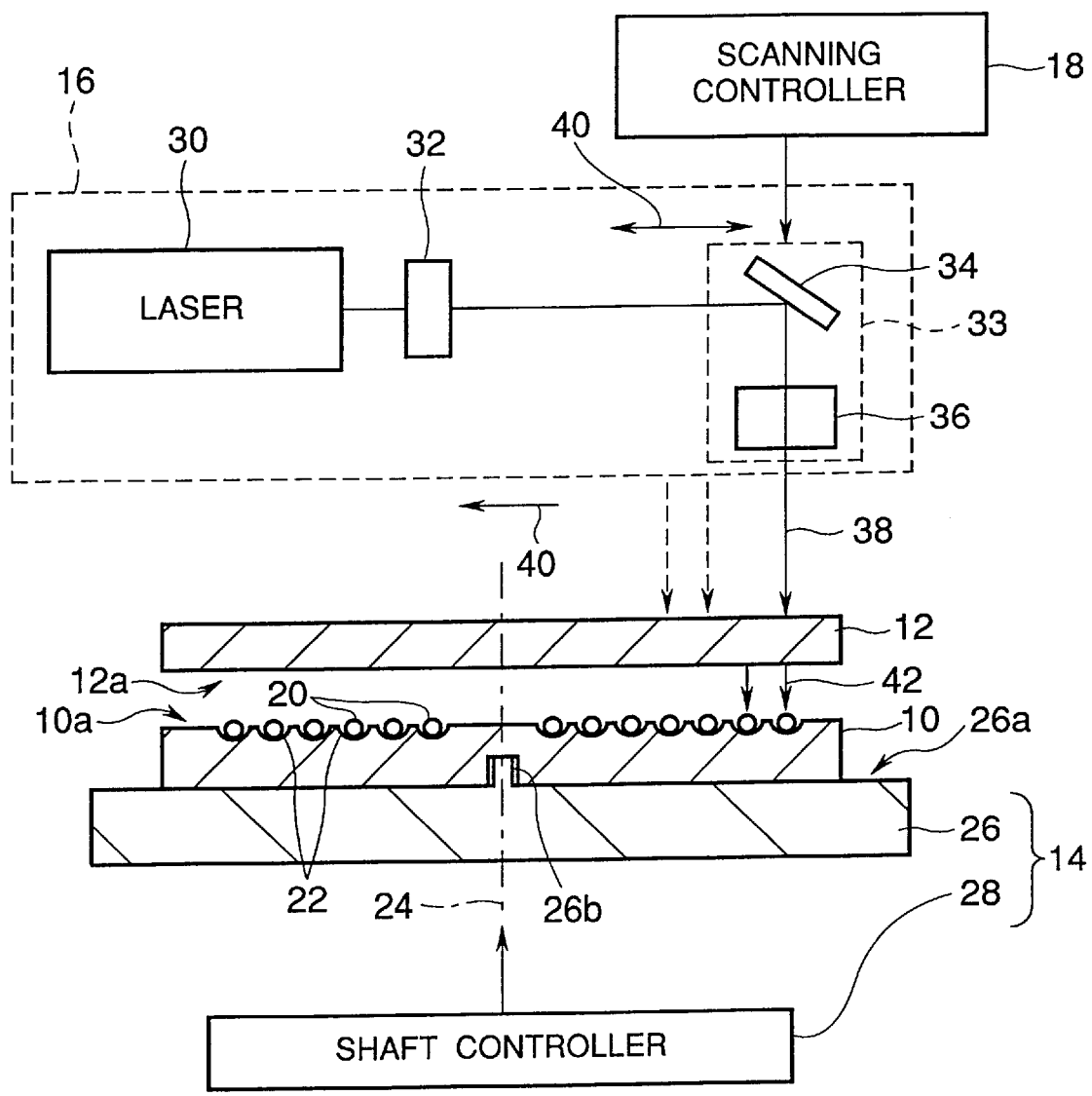
FIG. 1 schematically shows an apparatus, embodying the present invention, for manufacturing an optical filter.

Embodiments of the invention will be described with reference to the attached illustrative drawings. Similar elements in different embodiments will be indicated by the same reference numerals, without repeated descriptions.

FIG. 1 shows a first embodiment of the invented apparatus for manufacturing an optical filter. The main components are a fiber holder 10, a phase mask 12, a rotating stage 14, an optical system 16, and a scanning controller 18. A photosensitive optical fiber 20 is placed in a spiral groove 22 in the upper surface 10a of the fiber holder 10. The fiber holder 10 is placed on the rotating stage 14, and the phase mask 12 is secured above the fiber holder 10. The optical system 16 generates a beam of ultraviolet light, which illuminates the photosensitive optical fiber 20 through the phase mask 12. The scanning controller 18 controls the optical system 16 so that as the rotating stage 14 turns, the ultraviolet beam scans the photosensitive optical fiber 20.

The upper surface 10a of the fiber holder 10 is flat. Although the drawing shows a space between the fiber holder 10 and phase mask 12, the phase mask 12 can be placed in contact with the upper surface 10a of the fiber holder 10, as described later. In any case, the phase mask 12 is secured to the fiber holder 10 so that the lower surface 12a of the phase mask 12 is parallel to the upper surface 10a of the fiber holder 10.

The phase mask 12 is formed as a flat plate of a material, such as quartz glass, that is substantially transparent to ultraviolet light. The lower surface 12a of the phase mask 12 has a spiral diffraction grating comprising pits that diffract the ultraviolet light generated by the optical system 16.

The rotational axis 24 of the rotating stage 14 is perpendicular to the upper surface 10a of the fiber holder 10. The rotating stage 14 comprises a turntable 26 on which the fiber holder 10 rests, and a shaft controller 28 that rotates the turntable 26 around the axis 24. The shaft controller 28 comprises, for example, a motor and associated driving circuitry (not visible).

Where the rotational axis 24 passes through the upper surface 26a of the turntable 26, the turntable 26 preferably has a projecting hub 26b with, for example, a cylindrical shape, which engages a similarly-shaped hole in the lower surface of the fiber holder 10 to ensure that the fiber holder 10 and phase mask 12 are correctly centered on the axis 24. When the shaft controller 28 rotates the turntable 26, the fiber holder 10 and phase mask 12 also rotate around the axis 24.

The optical system 16 has a laser light source 30, an optical attenuator 32, and a movable unit 33 comprising a mirror 34 and cylindrical lens 36. The laser light source 30 emits a beam of ultraviolet light that passes through the optical attenuator 32, is reflected through a right angle by the mirror 34, passes through the cylindrical lens 36, and illuminates the phase mask 12. A krypton-fluoride (KrF) excimer laser of the type manufactured by Lambda Physik GmbH of Göttingen, Germany, emitting pulses of ultraviolet light with a wavelength of two hundred forty-eight nanometers (248 nm), is suitable as the laser light source 30. The intensity of the ultraviolet beam emitted by the laser light source 30 is adjusted to a suitable level by the optical attenuator 32. The beam diameter is adjusted by the cylindrical lens 36. The ultraviolet beam 38 exiting the optical system 16 is aligned parallel to the rotational axis 24 of the rotating stage 14.

The scanning controller 18 moves the movable unit 33 comprising the mirror 34 and cylindrical lens 36 in the direction of arrow 40, parallel to the direction of propagation of the ultraviolet light emitted by the laser light source 30. The ultraviolet beam 38 exiting the optical system 16 is thereby scanned across the surface of the phase mask 12 in the radial direction. The scanning is synchronized with the rotation of the rotating stage 14 by a master controller (not visible) that controls both the scanning controller 18 and the shaft controller 28. Diffraction of the ultraviolet beam 38 by the phase mask 12 produces a diffracted beam 42 that follows the spiral path of the photosensitive optical fiber 20 on the fiber holder 10. This diffracted beam 42 creates a Bragg grating in the core of the photosensitive optical fiber 20.

Figure 2A:
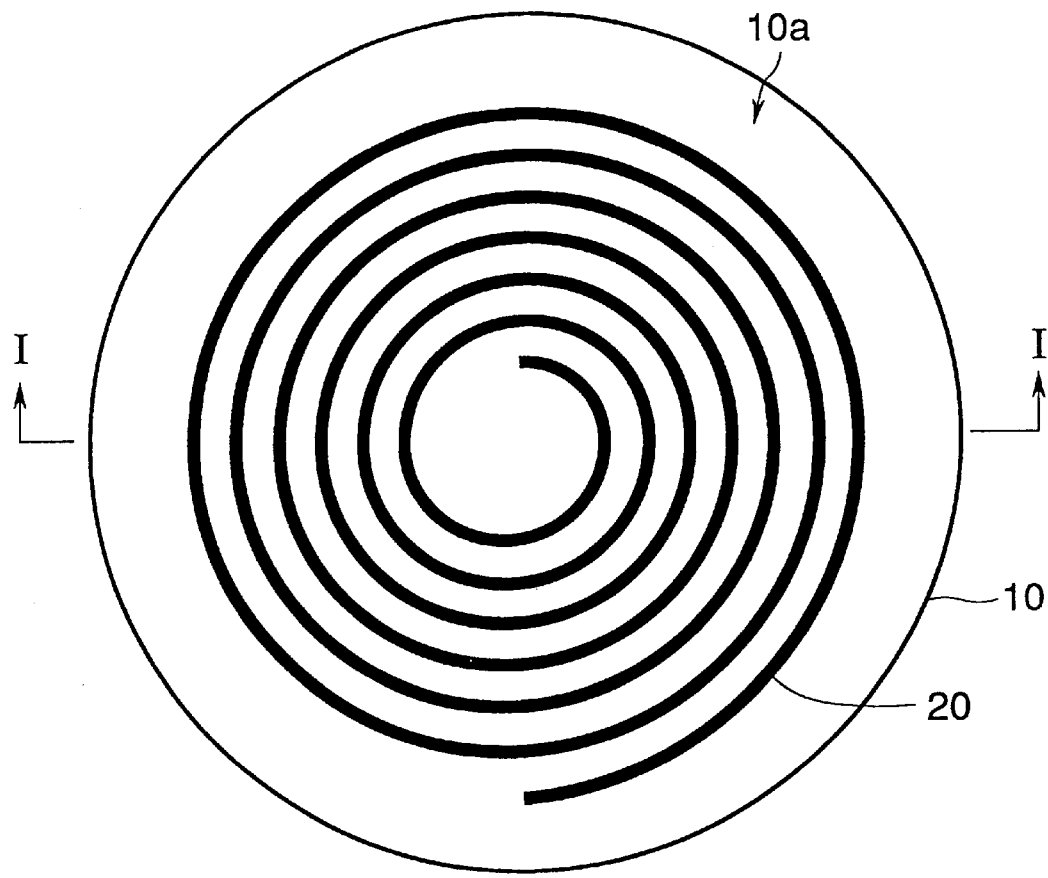
FIG. 2A is a plan view of the fiber holder in FIG. 1.
Figure 2B:
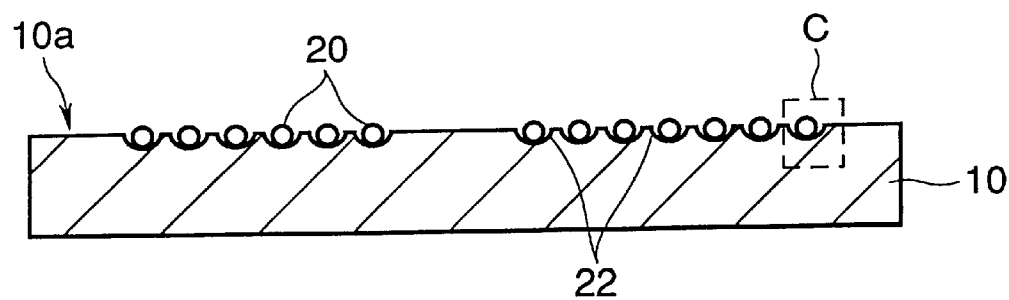
FIG. 2B is a sectional view of the fiber holder and optical fiber in FIG. 1.

FIG. 2A shows a plan view of the upper surface 10a of the fiber holder 10. FIG. 2B shows a sectional view through line I—I in FIG. 2A. These drawings also show the photosensitive optical fiber 20.

The fiber holder 10 is, for example, a circular disc formed from a metal material such as aluminum or stainless steel, or from various non-metallic materials that will be described in a later embodiment. In the following description, the diameter of the fiber holder 10 is five inches (approximately 127 mm). The spiral groove 22 is a single continuous groove that holds the photosensitive optical fiber 20 so that the photosensitive optical fiber 20 also follows a spiral path. The upper surface 10a of the fiber holder 10, including the inner surface of the spiral groove 22, is coated to suppress reflection of ultraviolet light, so that reflected ultraviolet light does not disturb the Bragg grating formed by the diffracted beam 42.

For clarity, the spiral groove 22 in FIGS. 2A and 2B is shown following a widely spaced spiral path that extends from a point near the periphery of the fiber holder 10 to a point near the center. For simplicity, it will be assumed that the entire spiral path is scanned by the optical system 16. In practice, the optical system need not scan the entire spiral path, and the scanned part of the spiral path may be more closely spaced, so that the radius of curvature of the spiral does not vary greatly over the scanned part. The scanned part is preferably disposed near the outer edge of the fiber holder 10. In addition, although the spiral groove 22 is shown in FIG. 2B as having a semicircular cross section, the cross section may be rectangular or have any other suitable shape.

Figure 3A:
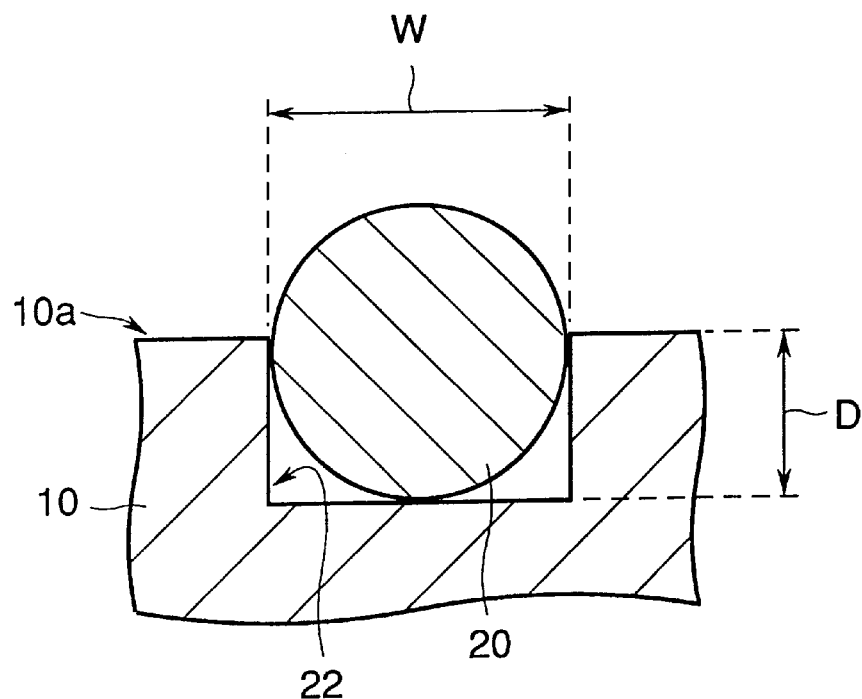
FIG. 3A is an enlarged sectional view showing one preferred configuration of the spiral groove and optical fiber in FIG. 1.
Figure 3B:
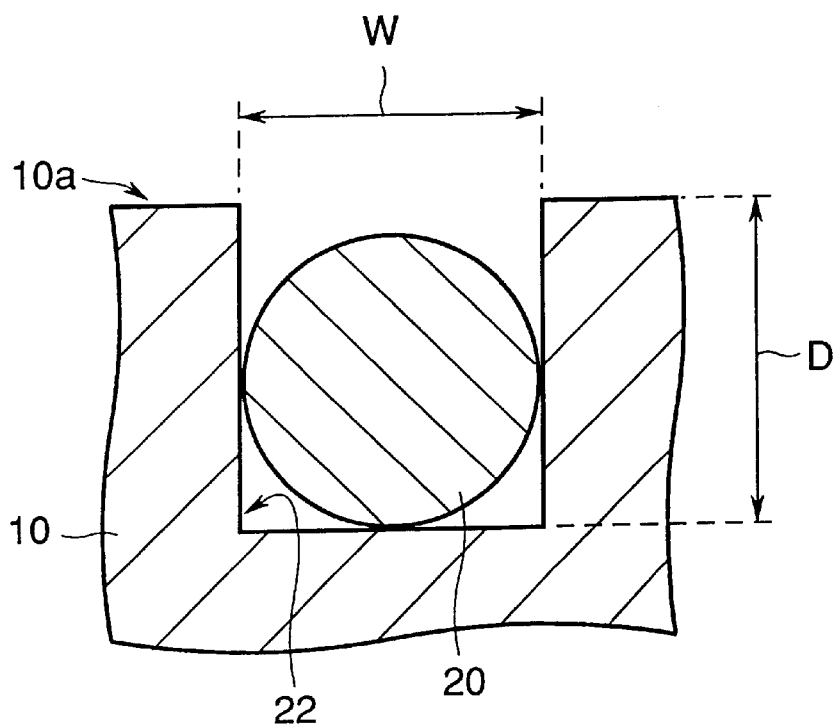
FIG. 3B is an enlarged sectional view showing another preferred configuration of the spiral groove and optical fiber in FIG. 1.

FIGS. 3A and 3B are enlarged views of area C in FIG. 2B, showing two possible rectangular cross sections of the spiral groove 22. In both drawings, the width W of the spiral groove 22 is substantially the same as the diameter of the photosensitive optical fiber 20.

In FIG. 3A, the depth D of the spiral groove 22 is substantially equal to half the diameter of the photosensitive optical fiber 20. To hold the photosensitive optical fiber 20, the spiral groove 22 should be at least this deep. The upper half of the photosensitive optical fiber 20 extends above the surface 10a of the fiber holder 10, so when this type of groove is employed, a spacer should be provided between the fiber holder 10 and phase mask 12 to prevent damage to the photosensitive optical fiber 20.

In FIG. 3B, the depth D of the spiral groove 22 is greater than the diameter of the photosensitive optical fiber 20. This type of groove permits the phase mask 12 to be placed in direct contact with the fiber holder 10 without risk of damage to the photosensitive optical fiber 20.

In view of the coherence length of the diffracted beam 42, the distance from the lower surface 12a of the phase mask 12 to the core of the photosensitive optical fiber 20 should be approximately sixty micrometers (60 $\mu$m). If the fiber diameter is one hundred twenty-five micrometers (125 $\mu$m), for example, then the width W of the spiral groove 22 should be in the range from one hundred twenty to one hundred thirty micrometers (120 $\mu$m to 130 $\mu$m), and the depth D should be in the range from about sixty to one hundred thirty micrometers (60 $\mu$m to 130 $\mu$m).

Figure 4:
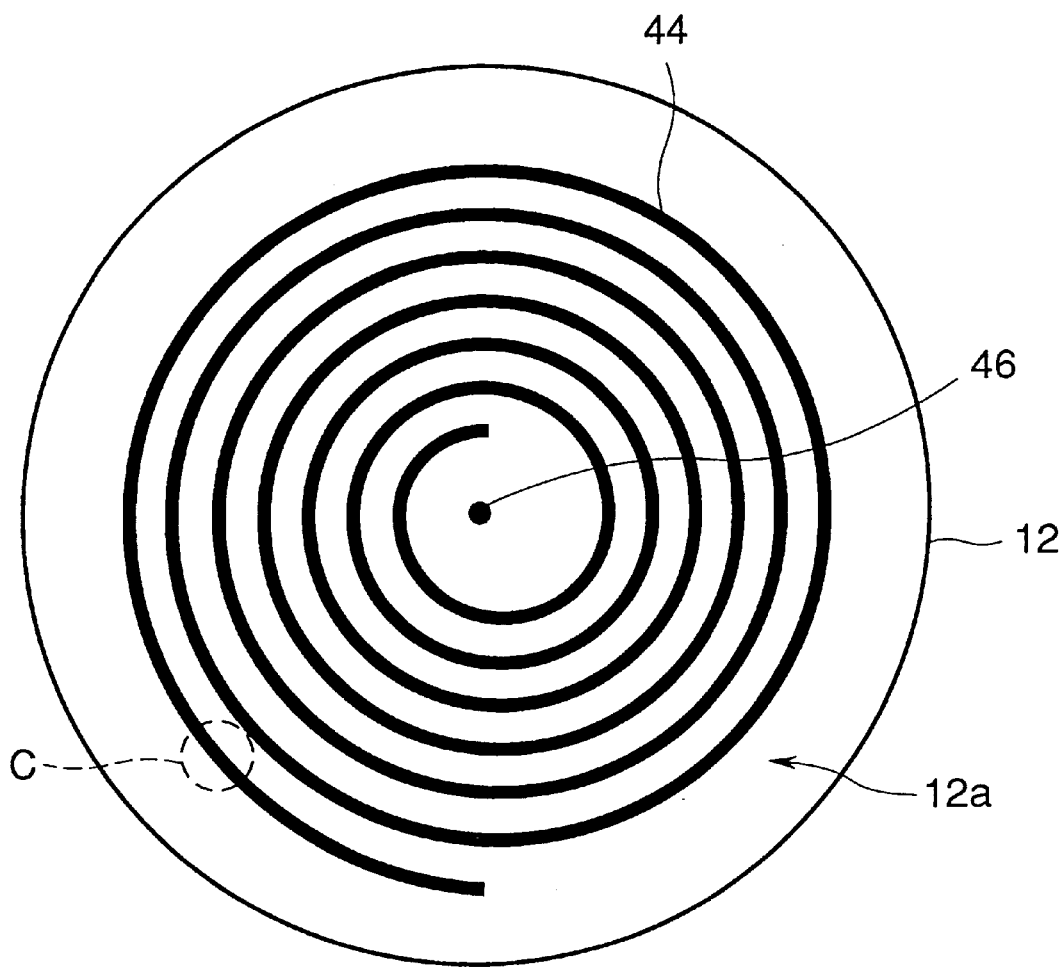
FIG. 4 is a plan view of the phase mask in FIG. 1.

FIG. 4 shows a plan view of the lower surface 12a of the phase mask 12. The phase mask 12 is, for example, a circular disc having the same five-inch diameter as the fiber holder 10. Quartz glass is a suitable material for the phase mask 12, as mentioned above, but other materials transparent to ultraviolet light, such as calcium fluoride or magnesium fluoride, can be used instead.

The pits in the lower surface 12a of the phase mask 12 form a spiral diffraction grating 44 that is alignable with the spiral groove 22 on the upper surface 10a of the fiber holder 10 when the phase mask 12 is placed on the fiber holder 10.

The spiral diffraction grating 44 winds around the center 46 of the phase mask 12. The pits occur at periodic intervals, and at gradually increasing distances from the center 46.

Figure 5A:
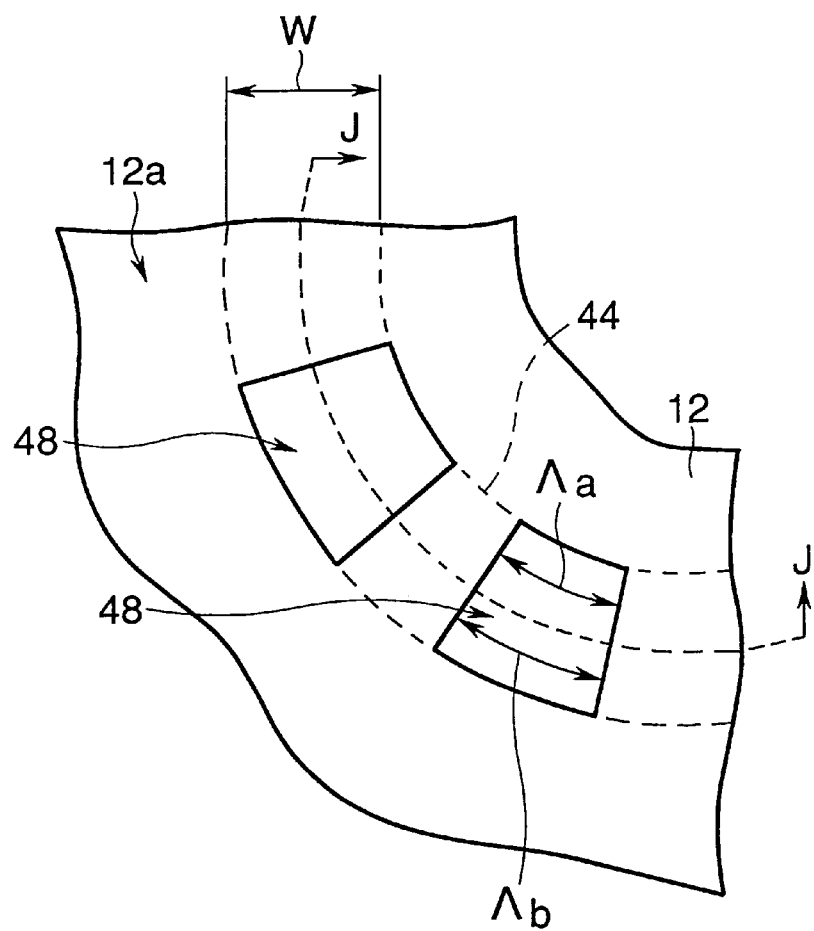
FIG. 5A is an enlarged plan view showing part of the phase mask in FIG. 4.
Figure 5B:
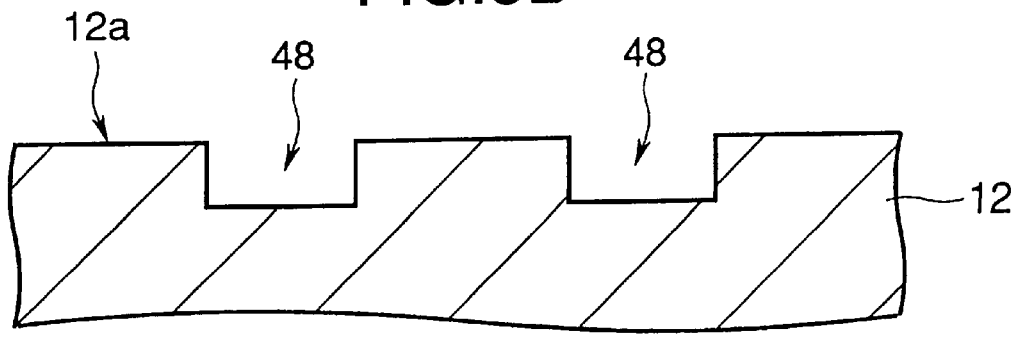
FIG. 5B is a sectional view through the pits shown in FIG. 5A.

FIG. 5A shows an enlarged view of area C in FIG. 4. FIG. 5B shows a sectional view along curve J—J in FIG. 5A. The pits 48 shown in FIGS. 5A and 5B have the form of nearly rectangular wedges, with inner and outer edges conforming to the path followed by the spiral diffraction grating 44. If $\Lambda_a$ is the length of the inner edge and $\Lambda_b$ is the length of the outer edge of one of the pits 48, then $\Lambda_a$ is slightly shorter than $\Lambda_b$. The spacing between adjacent pits 48 is also greater at the outer edge than at the inner edge.

Figure 6:
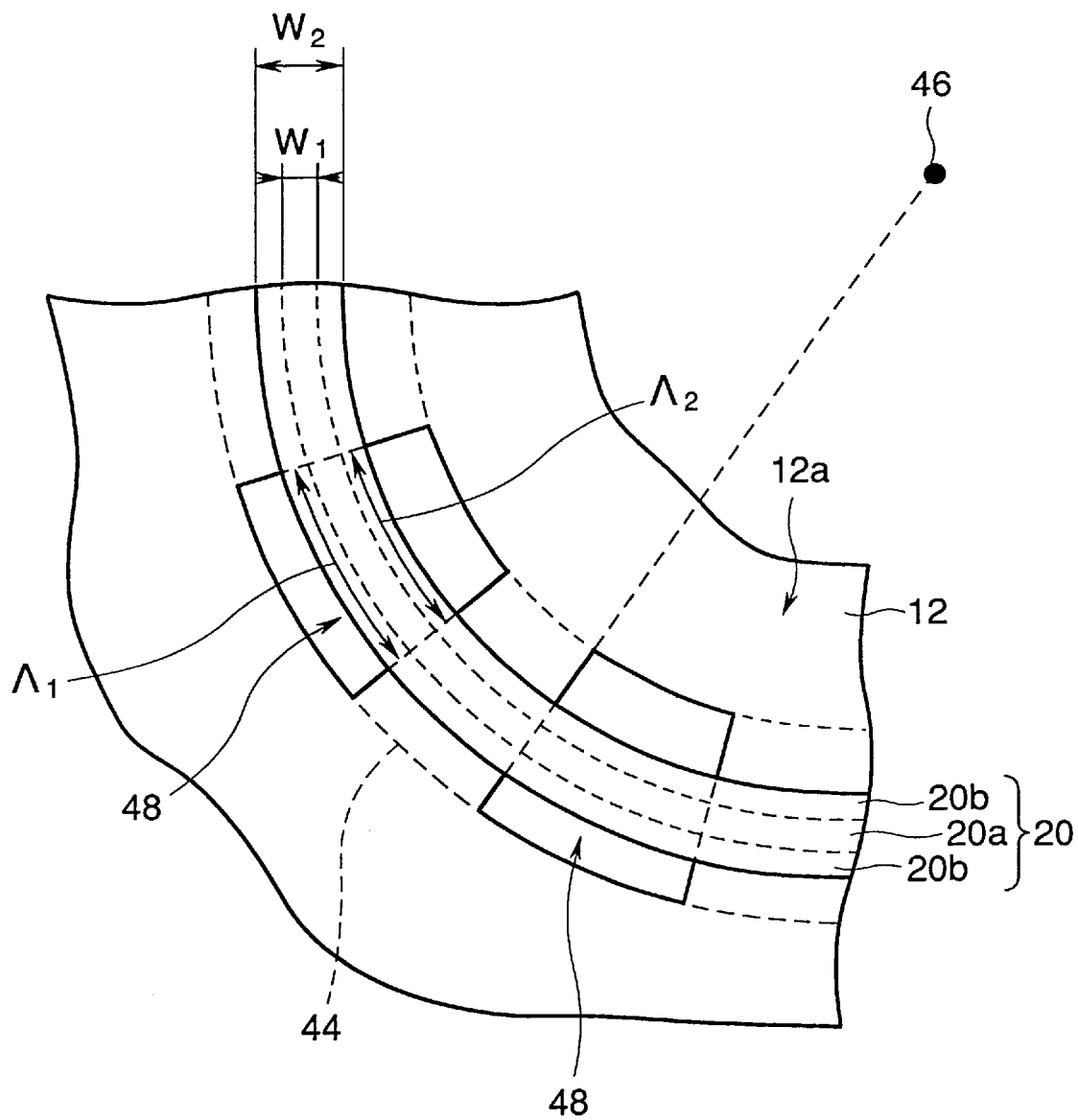
FIG. 6 is an enlargement of FIG. 5A, illustrating dimensions of the optical fiber and pits.

FIG. 6 as an enlarged plan view of the part of the phase mask 12 shown in FIG. 5A superimposed on the photosensitive optical fiber 20 held in the fiber holder 10, the center of the photosensitive optical fiber 20 coinciding with curve J—J in FIG. 5A. This drawing shows the relative positions of the spiral diffraction grating 44 and photosensitive optical fiber 20 when the fiber holder 10 and phase mask 12 are correctly aligned. The photosensitive optical fiber 20 comprises a core 20a and a clad 20b, in both of which the principal components are silicon dioxide ($SiO_2$) and germanium dioxide ($GeO_2$). The ratio of these components is adjusted so that the core 20a has a higher refractive index than the clad 20b. The diameter $W_1$ of the core 20a is ten micrometers (10 μm). The diameter $W_2$ of the entire fiber, including the core 20a and clad 20b, is in the range from about one hundred ten to one hundred thirty micrometers (110 μm to 130 μm).

The difference between the length of a pit 48 as measured along the outer edge of the core 20a ($\Lambda_1$) and the length as measured along the inner edge of the core 20a ($\Lambda_2$) is given by the ratio of the core diameter to the radius of curvature of the spiral. If the spiral groove 22 is confined to an area near the periphery of the fiber holder 10, and the spiral diffraction grating 44 is likewise located near the periphery of the phase mask 12, where the radius of curvature of the spiral is close to two and one-half inches (approximately 64 mm), then the difference between $\Lambda_1$ and $\Lambda_2$ is only about 0.015%. This difference is too small to have a significant effect on the Bragg grating produced in the fiber core. Apart from its greater overall length, a Bragg grating created by the invented phase mask 12 is substantially indistinguishable from a Bragg grating created by a conventional phase mask.

The phase mask 12 can be fabricated by the same method as used to fabricate a conventional phase mask. The method is briefly as follows. First, a thin film of chromium is deposited on a quartz glass disc, by sputtering or by vacuum evaporation, for example. Next, the chromium film is patterned by electron-beam photolithography. The quartz glass disk is etched with the remaining chromium film as a mask to form the pits 48. A reactive ion etching process can be employed, for example. The pits 48 are formed in the parts of the disc not covered by the chromium film. Finally, the remaining chromium film is removed to complete the phase mask 12. This fabrication process can be carried out with well-known equipment of the type used to fabricate integrated circuits on five-inch silicon wafers.

Figure 7A:
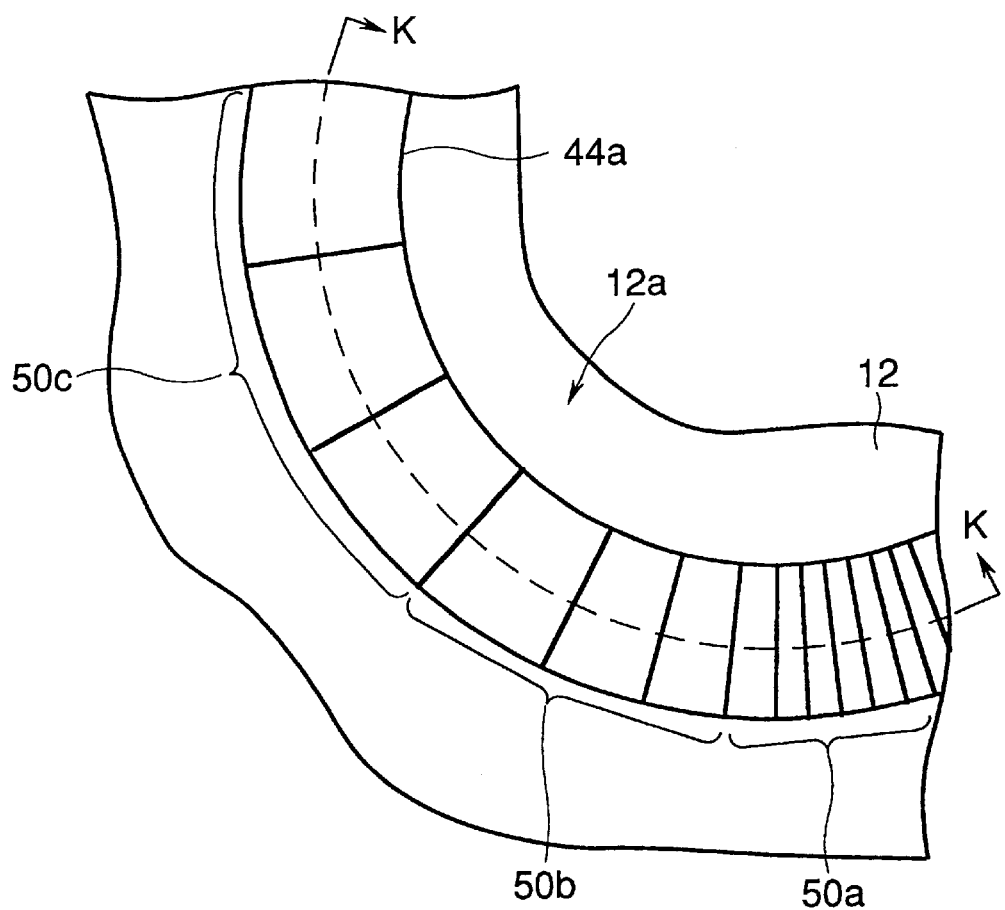
FIG. 7A is a plan view of part of a phase mask having a chirped spiral grating.
Figure 7B:
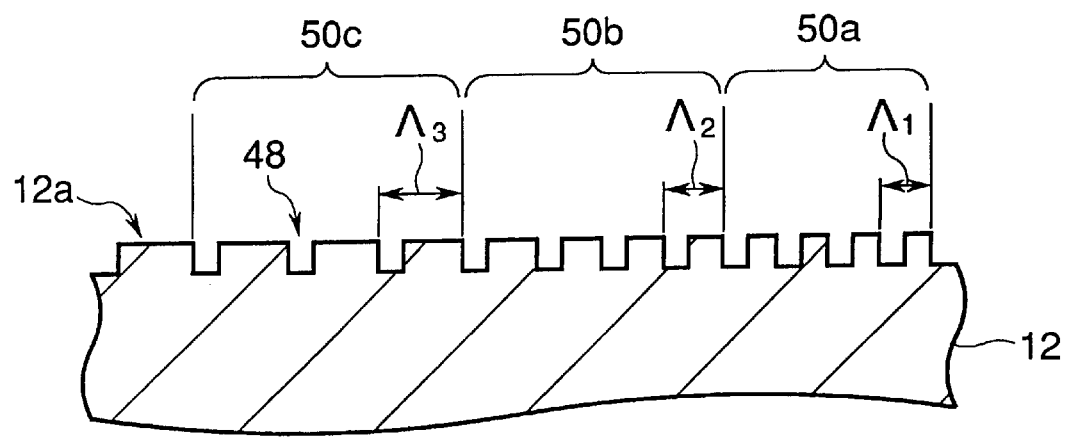
FIG. 7B is a sectional view of the chirped spiral grating in FIG. 7A.

A chirped grating can be formed by varying the spacing between the pits 48. Chirped gratings can widen the reflection band of the optical filter. FIG. 7A shows a plan view of part of a phase mask 12 with a chirped spiral diffraction grating 44a. FIG. 7B is a sectional view along curve K—K in FIG. 7A.

The part of the chirped grating 44a shown in FIGS. 7A and 7B is divided into three zones 50a, 50b, and 50c. The spacing of the pits 48 is $\Lambda_1$ in the first zone 50a, $\Lambda_2$ in the second zone 50b, and $\Lambda_3$ in the third zone 50c, where $\Lambda_1<\Lambda_2<\Lambda_3$. The grating spacing thus increases in steps along the length of the grating. Chirped gratings in which the grating spacing varies continuously can also be fabricated.

The apparatus described above is used as follows to manufacture an optical filter.

A suitable photosensitive optical fiber 20 is the SMF28 fiber manufactured by Corning, Incorporated, of Corning, N.Y. The core and clad of this fiber are enclosed in a protective jacket. The first step is to remove the protective jacket, by using a tool referred to as a fiber stripper, for example, or by dipping the fiber in dichloroethane.

The stripped photosensitive optical fiber 20 is placed in the spiral groove 22 on the upper surface 10a of the fiber holder 10, so that the photosensitive optical fiber 20 is held in the same spiral arrangement as the spiral groove 22, and the fiber holder 10 and phase mask 12 are mutually aligned. The alignment process can be carried out by placing the fiber holder 10 and phase mask 12 on separate stages, the relative positions of which are adjustable on three orthogonal axes and one rotational axis, and using a microscope to observe the pits 48 and fiber 20 through the phase mask 12. When the fiber holder 10 and phase mask 12 are in correct mutual alignment, they are secured in this alignment, by means of clamps or clips, for example, or by evacuating the intervening space with a vacuum chuck. A spacer may be placed between the fiber holder 10 and phase mask 12 to protect the photosensitive optical fiber 20, as noted above.

Figure 8:
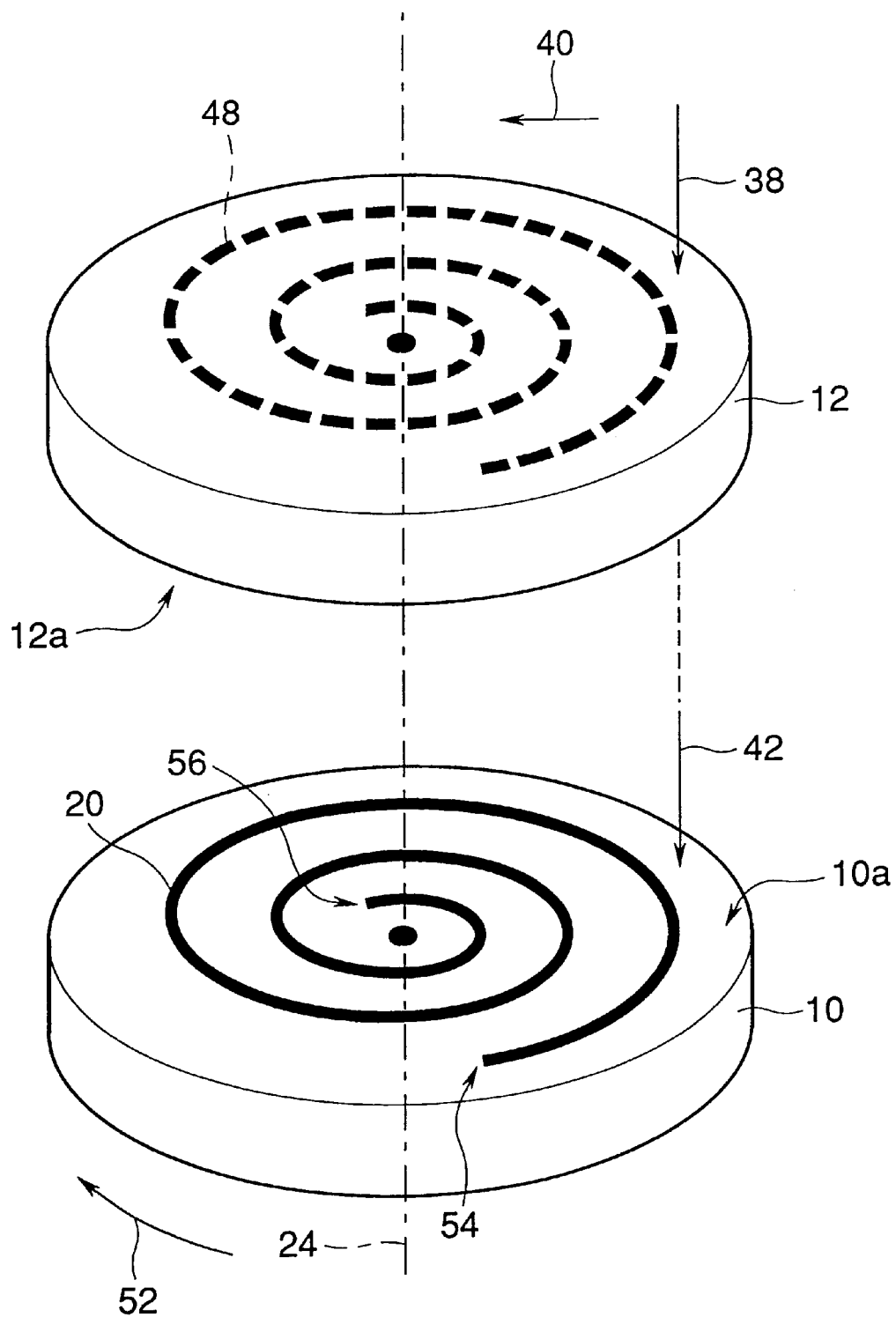
FIG. 8 is a perspective view illustrating the invented method of manufacturing an optical filter.

The fiber holder 10 and phase mask 12 are then placed as a single unit on the turntable 26 in the rotating stage 14. The scanning controller 18 and the shaft controller 28 move the movable unit 33 and turntable 26 to an initial position from which the scan is to begin. After this initial position has been established and the laser light source 30 has been energized, the shaft controller 28 drives the turntable 26 at a constant rotational speed, turning the fiber holder 10 and phase mask 12 in the direction of arrow 52 in FIG. 8, and the scanning controller 18 moves the movable unit 33 at a constant linear speed in the direction of arrow 40 in FIG. 8. These motions are synchronized so that the ultraviolet beam 38 follows the spiral pattern of the pits 48 in the lower surface 12a of the phase mask 12, and the diffracted beam 42 follows the path of the photosensitive optical fiber 20, in the direction from the outer end 54 toward the inner end 56 of the spiral.

The rotational speed is sufficiently slow in relation to the repetition rate of the pulses emitted by the laser light source 30 that all points on the path traced out by the ultraviolet beam 38 receive substantially equal amounts of luminous energy. The pits 48 produce a regular diffraction pattern with alternating areas of high and low luminous intensity. The amount of luminous energy delivered by the diffracted beam 42 to the photosensitive optical fiber 20 therefore varies in a regular periodic manner along the length of the photosensitive optical fiber 20.

Exposure to ultraviolet light alters the refractive index of the core 20a of the photosensitive optical fiber 20, so the diffraction pattern created by the pits 48 is imprinted as a periodic refractive-index modulation pattern in the fiber core. An in-fiber Bragg grating is thereby created in the photosensitive optical fiber 20, converting the photosensitive optical fiber 20 into an optical filter. To facilitate use of the optical filter as a system component, standard optical fiber connectors are attached to the ends of the photosensitive optical fiber 20. Alternatively, an optical fiber connector is attached to one end of the photosensitive optical fiber 20, and a fiber terminator is attached to the other end, to suppress reflection of light transmitted through the optical filter.

The circumference of a five-inch fiber holder 10 is nearly forty centimeters (40 cm). If the spiral groove 22 is disposed near the periphery of the fiber holder 10, the spiral need make only about three turns around the center of the fiber holder 10 to produce an in-fiber Bragg grating with a length of one meter (1 m). The fiber holder 10 and phase mask 12 can be designed to enable the fabrication of in-fiber Bragg gratings with arbitrary lengths up to at least four meters (4 m).

In addition to creating longer in-fiber Bragg gratings than are practical with conventional step-and-repeat methods, the present invention is superior to the conventional methods in the uniformity and reproducibility of its results, because the entire grating is created in a single continuous process. These advantages improve manufacturing yields, and therefore reduce manufacturing costs.

Figure 9:
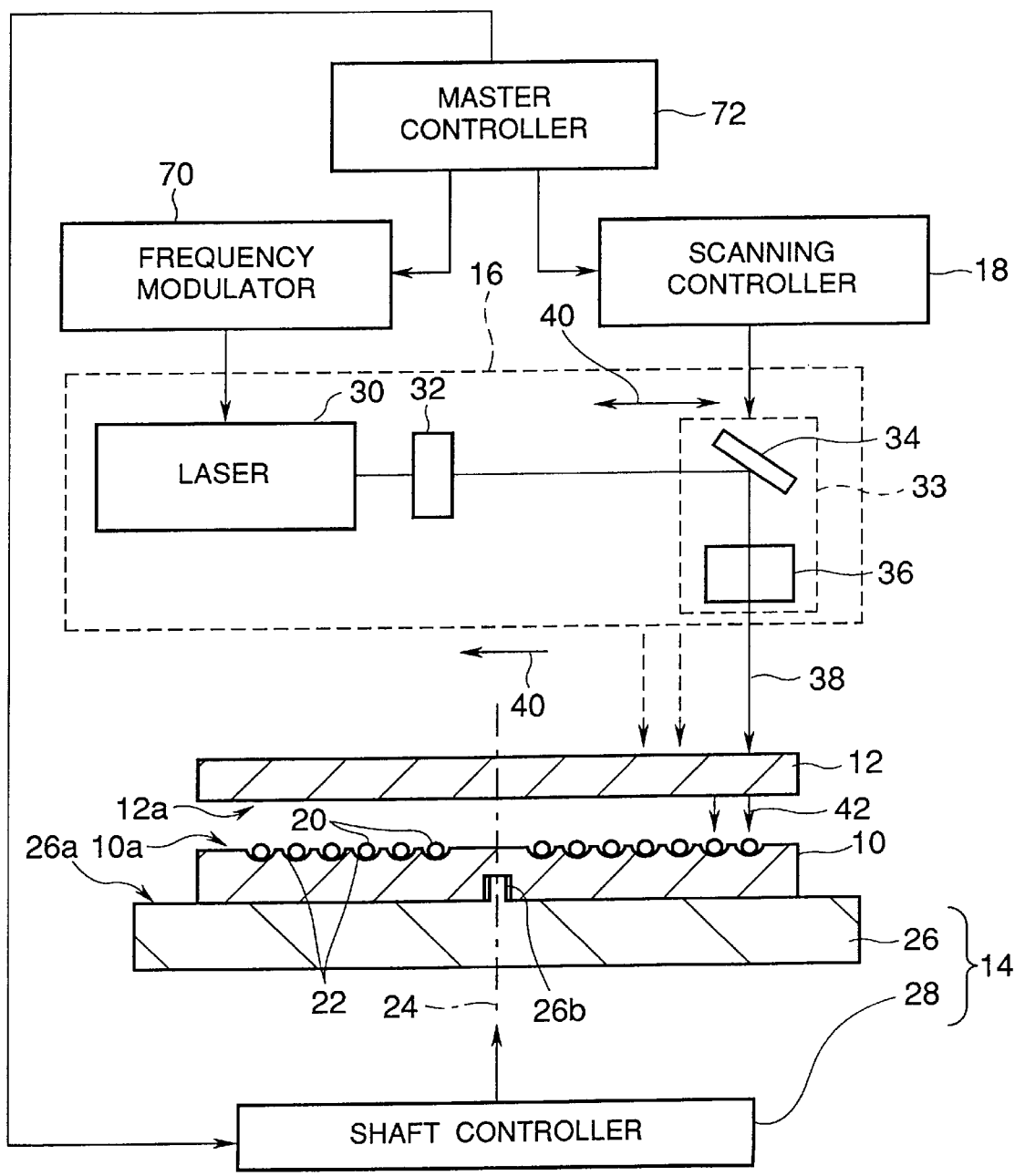
FIG. 9 schematically shows an apparatus, embodying the present invention, for manufacturing an apodized optical filter.

FIG. 9 shows a second embodiment of the invented apparatus for manufacturing an optical filter. Besides the elements already shown in the first embodiment, the second embodiment has an apodizing system comprising a frequency modulator 70 that controls the repetition rate of the pulses of ultraviolet light generated by the laser light source 30, and a master controller 72 that controls the scanning controller 18, shaft controller 28, and frequency modulator 70. The energy of each ultraviolet pulse is substantially independent of the repetition rate, so by varying the repetition rate, the frequency modulator 70 can vary the amount of energy delivered to different parts of the fiber core.

The frequency modulator 70 controls the pulse repetition rate according to positional information provided by the master controller 72. The fiber holder 10 is divided into three essentially concentric zones as indicated by the dashed line in FIG. 10. In the first zone 58a, the repetition rate is gradually increased, starting from the outer end 54 of the photosensitive optical fiber 20. In the second zone 58b, the repetition rate is held constant. In the third zone 58c, the repetition rate is gradually decreased toward the inner end 56 of the photosensitive optical fiber 20.

Figure 10:
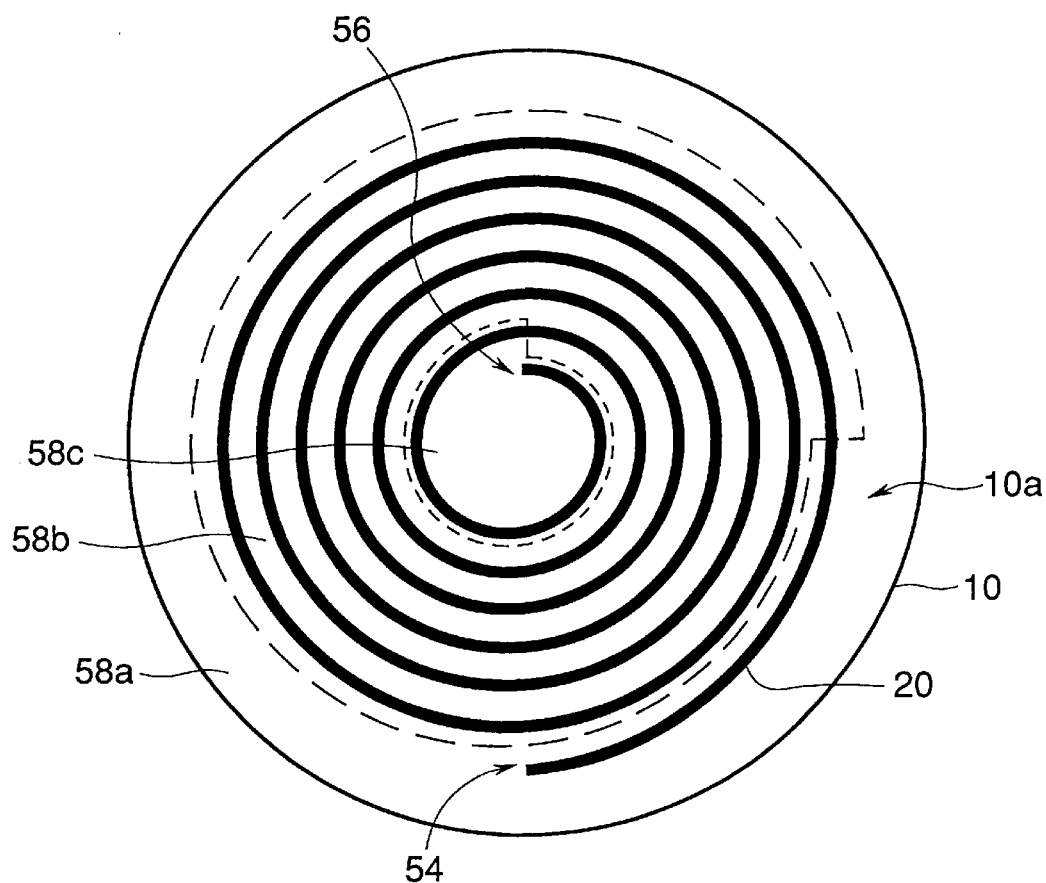
FIG. 10 is a plan view of the fiber holder in FIG. 9.
Figure 11:
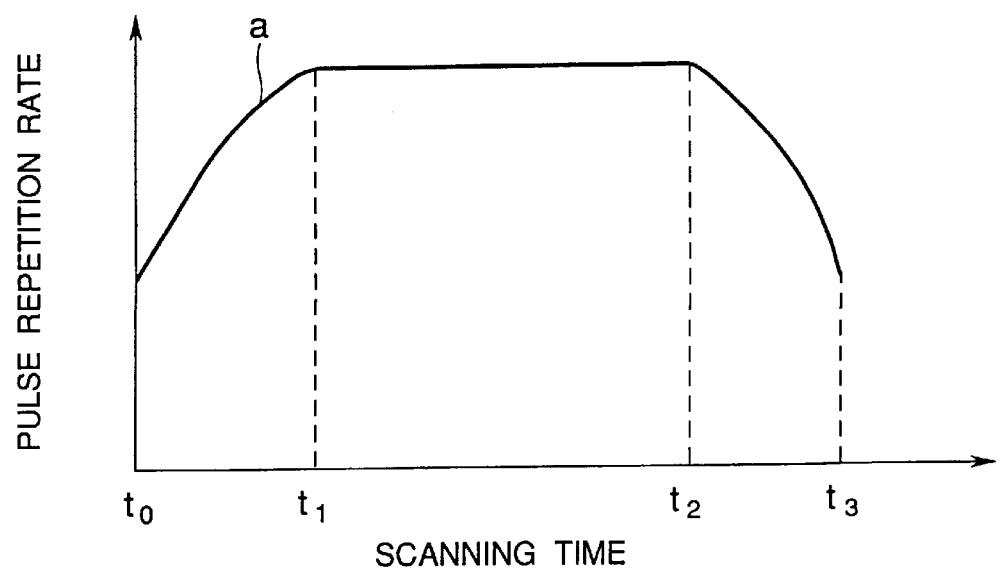
FIG. 11 is a graph illustrating the pulse repetition rate in the apparatus in FIG. 9.

The master controller 72 and frequency modulator 70 can control the repetition rate according to scanning time as shown in FIG. 11. The pulse repetition rate is shown on the vertical axis, and the scanning time on the horizontal axis. As indicated by the curve (a), the repetition rate increases from a starting time $t_0$ to a time $t_1$, corresponding to the first zone 58a in FIG. 10; is held substantially constant from time $t_1$ to time $t_2$, corresponding to the second zone 58b in FIG. 10; then decreases from time $t_2$ to time $t_3$, corresponding to the third zone 58c.

The master controller 72 and frequency modulator 70 can also control the pulse repetition rate to correct for the slow decrease in the scanning speed of the beam from the outer end 54 to the inner end 56 of the spiral, which is due to the combination of a constant rotational speed with the decreasing radius of curvature of the spiral. For example, the pulse repetition rate can be gradually decreased from time $t_1$ to time $t_2$, instead of being held constant.

Figure 12:
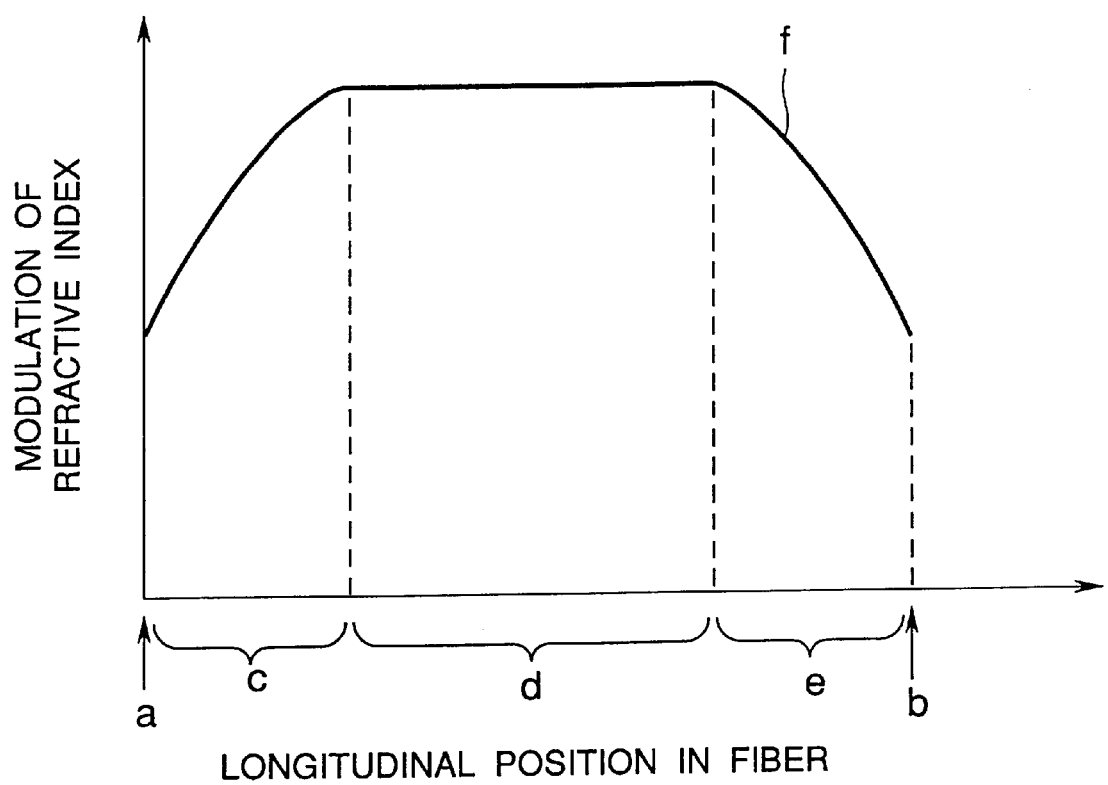
FIG. 12 is a graph illustrating the apodization curve of an optical filter manufactured with the apparatus in FIG. 9.

The result of this repetition-rate control is that the amount of ultraviolet light received by the fiber core gradually tapers off near the ends 54 and 56 of the fiber. The degree of modulation of the refractive index of the fiber is thus apodized as shown in FIG. 12. Position along the length of the fiber is shown on the horizontal index. Positions a and b correspond to the two ends of the in-fiber Bragg grating, while zones c, d, and e corresponds to zones 58a, 58b, and 58c on the fiber holder 10. The degree of modulation of the refractive index is indicated on the vertical axis. As shown by curve f, the degree of modulation increases in zone c, remains constant in zone d, and decreases in zone e.

Apodized in-fiber Bragg gratings can provide superior performance in regard to side-lobe suppression, sharpness of the edges of the reflection band, and flatness at the top of the reflection band. Desired filtering characteristics can be obtained by controlling the pulse repetition rate so as to obtain a suitable apodization profile.

As a variation of the second embodiment, a variable optical attenuator 32 can be employed, and the amount of ultraviolet light delivered to the fiber core can be controlled by controlling the attenuation factor, instead of controlling the pulse repetition rate.

Figure 13:
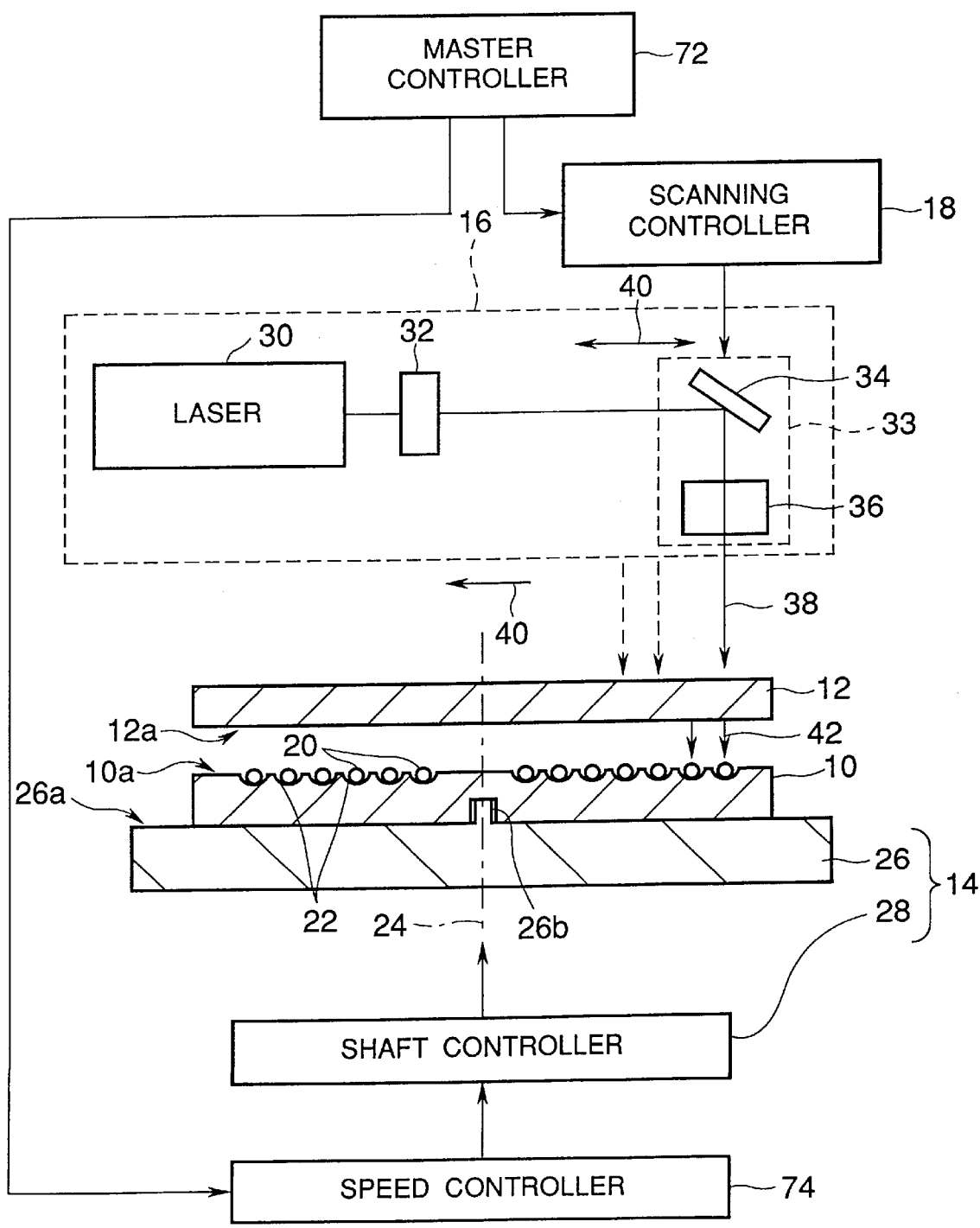
FIG. 13 schematically shows another apparatus, embodying the present invention, for manufacturing an apodized optical filter.

FIG. 13 shows a third embodiment of the invented apparatus. The third embodiment has the elements already shown in the first embodiment, a master controller 72 generally similar to the master controller 72 shown in the second embodiment, and a speed controller 74 that controls the shaft controller 28 in the rotating stage 14 according to positional information provided from the master controller 72. The pulse repetition rate of the laser light source 30 remains constant.

Figure 14:
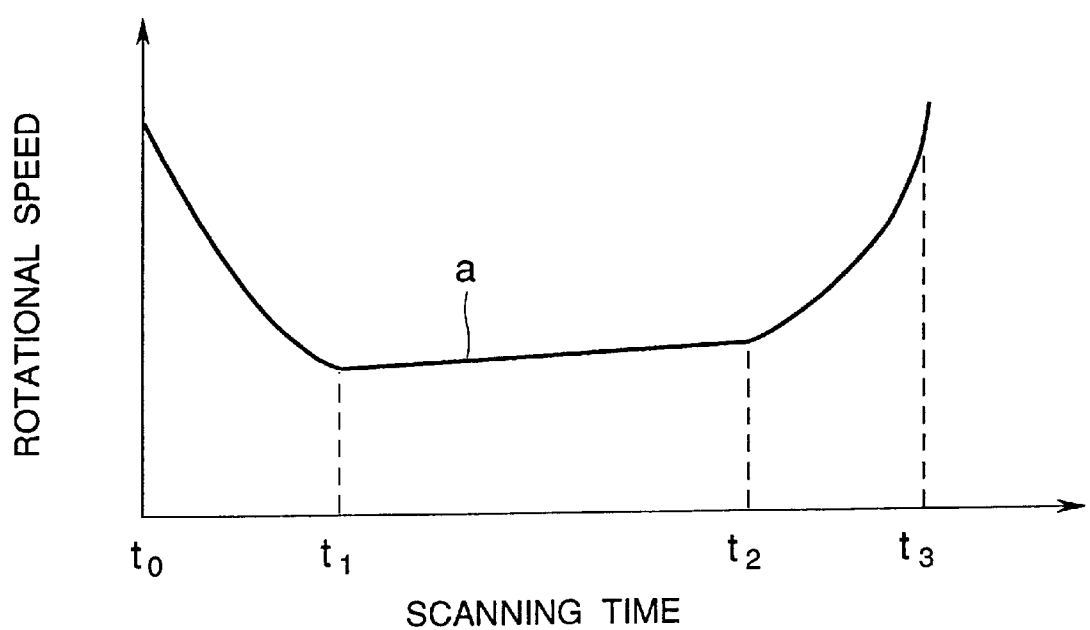
FIG. 14 is a graph illustrating the rotational speed of the rotating stage in the apparatus in FIG. 13.

The master controller 72 and speed controller 74 in the third embodiment constitute an apodizing system that controls the amount of ultraviolet light delivered to the core of the photosensitive optical fiber 20 by controlling the rotational speed of the rotating stage 14, as shown in FIG. 14. The horizontal axis in FIG. 14 indicates scanning time. The vertical axis indicates rotational speed. From time $t_0$ to time $t_1$, the rotational speed is gradually reduced, thereby increasing the amount of ultraviolet light received by the scanned portions of the photosensitive optical fiber 20. From time $t_1$ to the $t_2$, the rotational speed remains nearly constant, but is very gradually increased to compensate for the decreasing radius of curvature of the spiral, so that the amount of ultraviolet light received by the photosensitive optical fiber 20 remains constant. From time $t_2$ to time $t_3$, the rotational speed is increased at a faster rate, so that the amount of ultraviolet light received by the photosensitive optical fiber 20 is gradually decreased.

The time from $t_0$ to $t_1$ corresponds to the first scanning zone 58a shown in FIG. 10, the time from $t_1$ to time $t_2$ corresponds to the second zone 58b, and the time from $t_2$ to $t_3$ corresponds to the third zone 58c. The master controller 72 and scanning controller 18 vary the rate of motion of the movable unit 33 so that the scanning rate remains synchronized with the rotational speed of the rotating stage 14, and the ultraviolet beam 38 correctly tracks the spiral path of the photosensitive optical fiber 20.

The third embodiment has the same effect as the second embodiment, producing an apodized optical filter with an arbitrary index modulation profile. Desired filter characteristics can be obtained easily by suitable control of the rotational speed of the rotating stage 14.

A fourth embodiment of the invention concerns the packaging of an optical filter that has been manufactured by the first, second, or third embodiment. The fourth embodiment provides a two-part package in which the fiber holder 10 is used as the lower part, and a separate cover is added as the upper part.

Figure 15A:
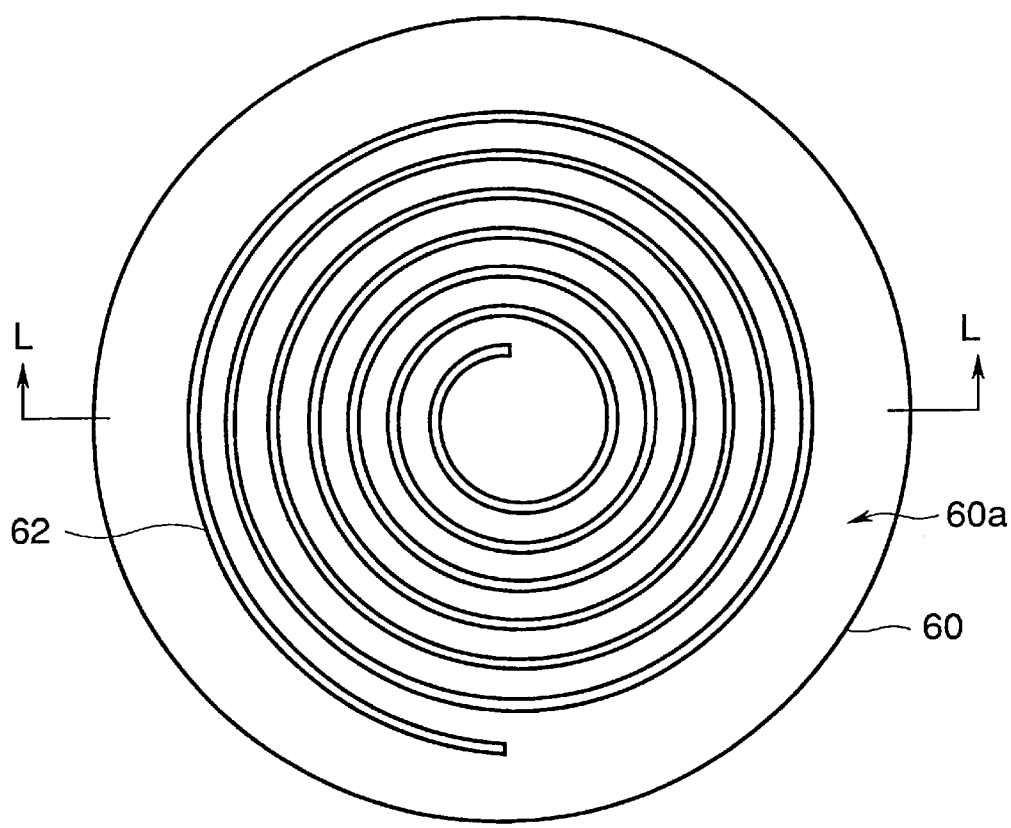
FIG. 15A is a plan view of a cover useful for packaging the invented optical filter.
Figure 15B:
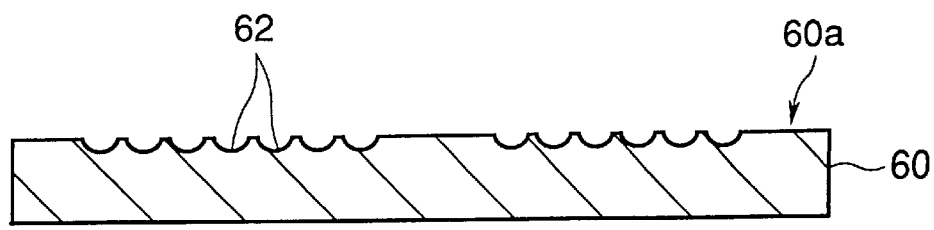
FIG. 15B is a sectional view of the cover in FIG. 15A.

FIG. 15A shows a plan view of the cover 60 as seen from below. FIG. 15B shows a sectional view through line L—L in FIG. 15A.

Figure 16:
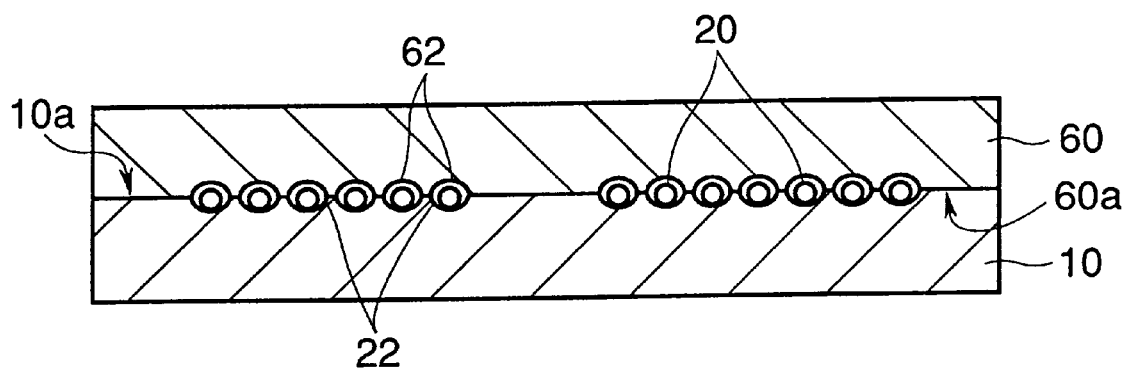
FIG. 16 is a sectional view illustrating the packaging of the optical filter using the cover in FIG. 15A.

The cover 60 is, for example, a circular disc with the same diameter as the fiber holder 10. The lower surface 60a of the cover 60 has a spiral groove 62 that is a mirror image of the spiral groove 22 in the upper surface 10a of the fiber holder 10. After the Bragg grating has been formed in the photosensitive optical fiber 20, the fiber holder 10 and phase mask 12 are removed from the rotating stage 14, the phase mask 12 is removed from the fiber holder 10, and the cover 60 is placed on the fiber holder 10, encasing the photosensitive optical fiber 20 as shown in FIG. 16. The cover 60 is fastened to the fiber holder 10 by nuts and bolts (not visible), for example, or by an epoxy adhesive.

Figure 17A:
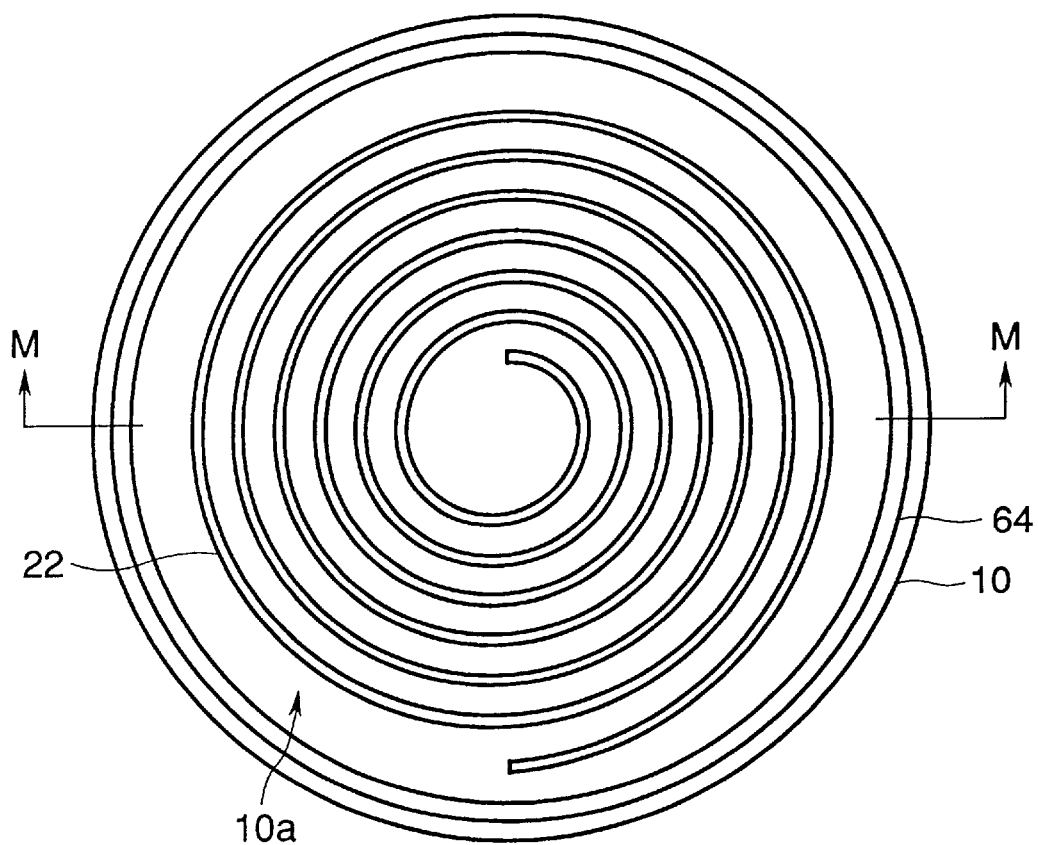
FIG. 17A is a plan view of another cover useful for packaging the invented optical filter.
Figure 17B:
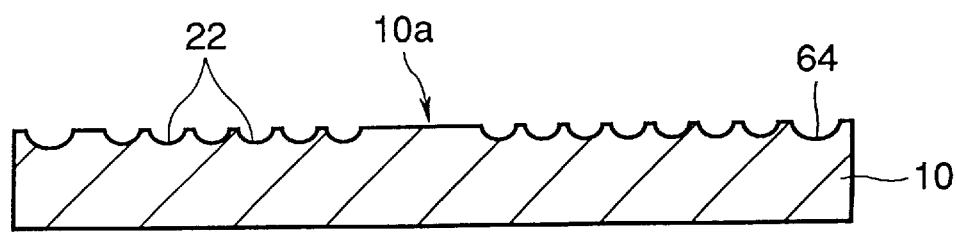
FIG. 17B is a sectional view of the cover in FIG. 17A.

If an epoxy adhesive is used to fasten the cover 60 to the fiber holder 10, the fiber holder 10 preferably has a channel for collecting extra adhesive. Referring to FIG. 17A, this channel 64 is a circular channel disposed near the outer circumference of the fiber holder 10. FIG. 17B shows a sectional view through line M—M in FIG. 17A, indicating that the channel 64 may be wider and deeper than the spiral groove 22 that holds the optical fiber. The epoxy adhesive is applied to suitable portions of the mating surfaces of the fiber holder 10 and cover 60, inward of the channel 64. When the fiber holder 10 and cover 60 are fastened together, some of the adhesive may be squeezed into the channel 64, but this adhesive collects in the channel 64 and is not squeezed out from between the fiber holder 10 and cover 60 onto the rims of the fiber holder 10 and cover 60. This simplifies the package assembly process.

The fiber holder 10 and cover 60 in the fourth embodiment are preferably made from a ceramic material selected from among aluminum oxide or alumina ($Al_2O_3$), titanium oxide ($TiO_2$), aluminum nitride (AlN), and boron nitride (BN). The coefficient of thermal expansion of the photosensitive optical fiber 20 is between $5 \times 10^{-7}/°$ C. and $1 \times 10^{-6}/°$ C. The above materials have coefficients of thermal expansion in the range from $1 \times 10^{-7}/°$ C. to $1 \times 10^{-6}/°$ C. If the optical fiber is encased in a package comprising these materials, since the coefficients of thermal expansion of the fiber and its package are approximately equal, the fiber will not be severely deformed by thermal expansion or contraction of the package.

Approximately equal coefficients of thermal expansion are also an advantage during the formation of the in-fiber Bragg grating, causing the dimensions of the photosensitive optical fiber 20 and fiber holder 10 to respond equally to heating by the ultraviolet beam 38.

For comparison, the coefficient of thermal expansion of aluminum is approximately $20 \times 10^{-6}/°$ C., and the coefficient of thermal expansion of stainless steel (SUS304) is approximately $18 \times 10^{-6}/°$ C., differing greatly from the coefficient of thermal expansion of the photosensitive optical fiber 20.

Needless to say, external access to the ends of the optical fiber 20 should be provided so that the packaged optical filter can be used as an optical filter module without opening the package. If optical fiber connectors, or an optical fiber connector and a fiber terminator, are connected to the two ends of the optical fiber 20, they can be accommodated by openings or enlarged grooves provided in the cover 60. For simplicity, these openings or enlarged grooves are not shown in the drawings The fourth embodiment provides a package that is easy to assemble, and does not require handling of the photosensitive optical fiber 20 during the packaging process. The package is mechanically sturdy, and protects the optical filter from accidental damage from a variety of external effects. These features lead to reduced packaging labor costs and increased manufacturing yields.

Next a fifth embodiment, also pertaining to the packaging of the manufactured optical filter, will be described.

Figure 18:
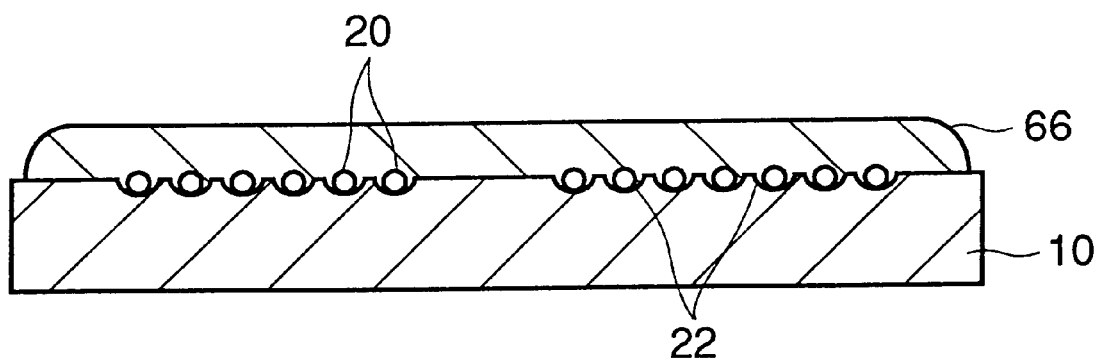
FIG. 18 is a sectional view illustrating another method of forming a cover for the invented optical filter.

Referring to FIG. 18, after the formation of the in-fiber Bragg grating and removal of the phase mask 12, the fiber holder 10 in the fifth embodiment is covered with a protective layer 66 of, for example, one of the materials mentioned above: aluminum oxide, titanium oxide, aluminum nitride, or boron nitride. The protective layer 66 is applied to the fiber holder 10 as a metal alkoxide solution by a standard thick-film formation process, such as silk-screen printing, doctor-blade printing, dip coating, spin coating, or spray coating. The protective layer 66 is then dried by heat treatment. Moderate heat treatment conditions can be employed, such as a temperature from 40° C. to 80° C. for a duration of two hours.

A protective layer 66 of one of the materials mentioned above can also be formed by a deposition process such as vacuum evaporation or sputtering.

Access to the ends of the photosensitive optical fiber 20 is provided through openings in the fiber holder 10 or protective layer 66. (These openings are omitted in the drawing.) Optical fiber connectors, or a fiber connector and a fiber terminator, are preferably attached to the ends of the photosensitive optical fiber 20 to create a packaged optical filter module as in the fourth embodiment.

The protective layer 66 should be thick enough to cover the photosensitive optical fiber 20 completely, but need not be as thick as the separate cover employed in the fourth embodiment. The optical filter module created in the fifth embodiment accordingly has the advantage of a thin, compact shape.

Like the fourth embodiment, the fifth embodiment provides a package that can be formed easily, without the need to handle the fiber. The fifth embodiment moreover shortens the total manufacturing time, because the protective layer 66 is formed already attached to the fiber holder 10. Moreover, by holding the photosensitive optical fiber 20 securely in the spiral groove 22, the protective layer 66 provides even more complete protection than in the fourth embodiment from external effects, including protection from vibration, making the packaged optical filter extremely easy to transport, store, and install. The protective layer 66 also helps to reduce aging changes and stabilize the optical characteristics of the optical filter.

Next, a sixth embodiment will be described. The sixth embodiment forms the fiber holder 10 by photolithographic patterning of an ultraviolet-curable polymer layer on a ceramic substrate, and packages the optical filter by applying another ultraviolet-curable polymer layer after formation of the in-fiber Bragg grating.

Figure 19A:
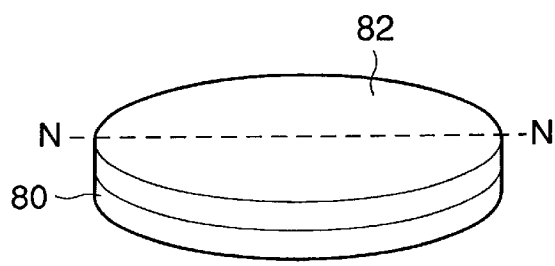
FIGS. 19A, 20A, 21A, 22A, and 23A are perspective views illustrating steps in a novel method of manufacturing an optical filter.
Figure 19B:
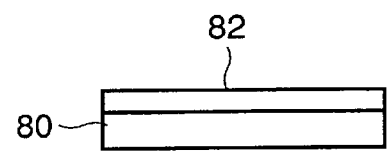
FIGS. 19B, 20B, 21B, 22B, and 23B are sectional views of the steps in FIGS. 19A, 20A, 21A, 22A, and 23A.

FIG. 19A is a perspective view illustrating a first step in the fabrication of the optical filter. FIG. 19B is a sectional view through line N—N in FIG. 19A. FIGS. 20A to 23A show similar perspective views of subsequent fabrication steps, and FIGS. 20B to 23B show corresponding sectional views.

FIGS. 19A and 19B show a ceramic substrate 80 covered by an ultraviolet-curable polymer layer 82 comprising, for example, the NEF-150 negative dry-film photoresist manufactured by the Nippon Synthetic Chemical Industry Company of Osaka, Japan. The polymer layer 82 can be attached to the substrate 80 by use of standard lamination equipment. NEF-150 has a thickness of fifty micrometers (50 μm), but two or three layers can be laminated to produce an ultraviolet-curable polymer layer 82 with a total thickness of one hundred or one hundred fifty micrometers (100 μm or 150 μm).

The total thickness of the ultraviolet-curable polymer layer 82 becomes the depth of the spiral groove 22 that will be formed next. If necessary, a total thickness of one hundred twenty-five micrometers (125 μm) can be obtained by combined use of the same manufacturer's NEF-125 dry-film photoresist, which has a thickness of twenty-five micrometers (25 μm).

Figure 20A:
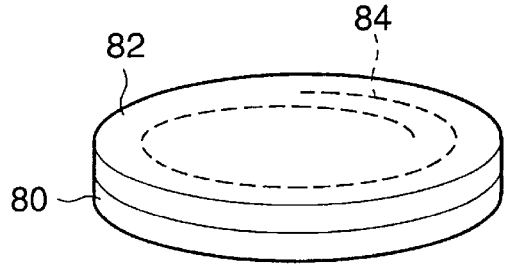
Figure 20B:
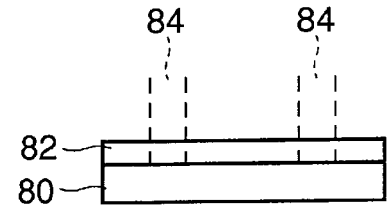
Figure 21A:
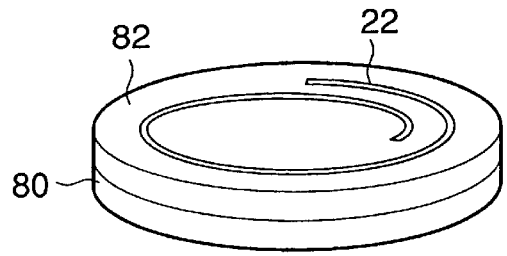
Figure 21B:
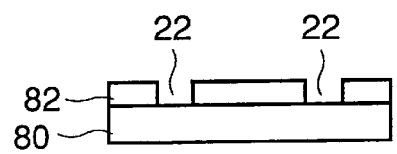

Referring to FIGS. 20A and 20B, the ultraviolet-curable polymer layer 82 is cured by exposure to ultraviolet light through a mask (not visible) that prevents exposure of a spiral portion 84 in the desired location of the spiral groove 22. Suitable exposure conditions are in the range from one hundred to six hundred millijoules per square centimeter (100 mJ/cm$^2$ to 600 mJ/cm$^2$). The polymer layer 82 is then developed in, for example, a 0.5% aqueous solution of sodium carbonate to remove the uncured portion 84, leaving a spiral groove 22 as shown in FIGS. 21A and 21B. This completes the fabrication of the fiber holder 10.

Figure 22A:
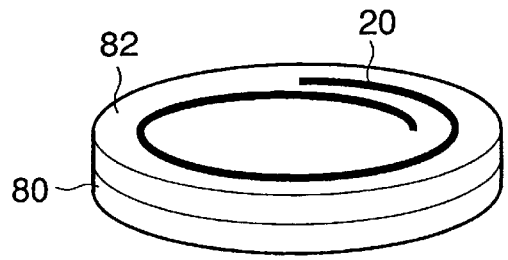
Figure 22B:
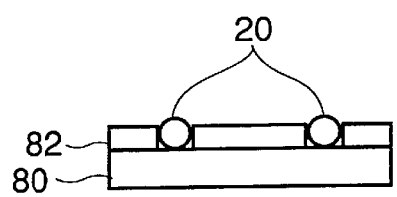
Figure 23A:
Figure 23B:
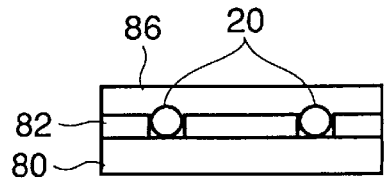

The photosensitive optical fiber 20 is now placed in the spiral groove 22 as shown in FIGS. 22A and 22B, and an in-fiber Bragg grating is formed by the process described in the first, second, or third embodiment. After the completion of this process, the phase mask 12 is removed, and the fiber holder 10 and photosensitive optical fiber 20 are covered with an upper protective layer 86 as shown in FIGS. 23A and 23B. The upper protective layer 86 comprises, for example, the ultraviolet-curable polymer material manufactured by the JSR Company of Tokyo, Japan under the name Desolite. This material is applied to the upper surface of the fiber holder 10, covering the photosensitive optical fiber 20, then cured by exposure to ultraviolet light.

As a final step (not illustrated), optical fiber connectors, or a fiber connector and a fiber terminator, are attached to the ends of the photosensitive optical fiber 20 to create a packaged optical filter module.

The package comprising the substrate 80 and the two polymer layers 82 and 84 provides the same advantages as in the fifth embodiment in terms of simplified manufacturing, a thin, compact shape, and excellent protection of the filter. A further advantage is that the spiral groove 22 can be formed with extremely high dimensional accuracy by the photolithographic process shown in FIGS. 19A to 21B. In particular, the groove depth is highly uniform. This accuracy and uniformity lead to the formation of a highly uniform and accurate in-fiber Bragg grating. Due to its accuracy and reproducibility, the photolithographic process also lends itself to high-volume, automated production.

Next, a seventh embodiment will be described. The seventh embodiment forms the fiber holder 10 by patterning an ultraviolet-curable polymer layer to form a dummy fiber on a ceramic substrate, coating the substrate with a layer of protective material, then removing the dummy fiber, leaving a groove to receive the photosensitive optical fiber 20. After formation of the in-fiber Bragg grating, another layer of the protective material is applied to package the optical filter.

Figure 24A:
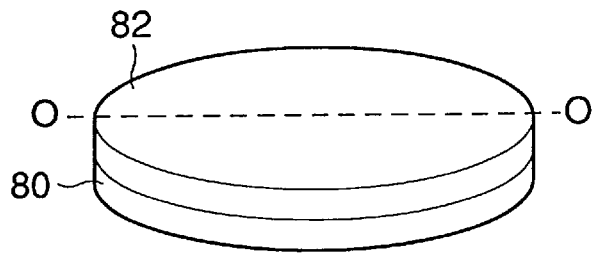
FIGS. 24A, 25A, 26A, 27A, 28A, 29A, and 30A are perspective views illustrating steps in another novel method of manufacturing an optical filter.
Figure 24B:
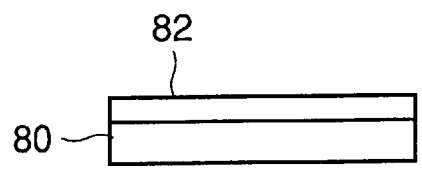
FIGS. 24B, 25B, 26B, 27B, 28B, 29B, and 30B are sectional views of the steps in FIGS. 24A, 25A, 26A, 27A, 28A, 29A, and 30A.

FIG. 24A is a perspective view illustrating a first step in the fabrication of the fiber holder 10. FIG. 24B is a sectional view through line O—O in FIG. 24A. FIGS. 25A to 30A show similar perspective views of subsequent fabrication steps, and FIGS. 25B to 30B show corresponding sectional views.

Referring to FIGS. 24A and 24B, a ceramic substrate 80 is covered by an ultraviolet-curable polymer layer 82 with a thickness substantially equal to the diameter of the photosensitive optical fiber 20. A laminated film comprising NEF-125 and/or NEF-150 photoresist can be employed, for example.

Figure 25A:
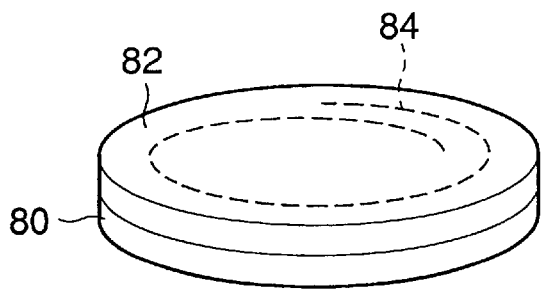
Figure 25B:
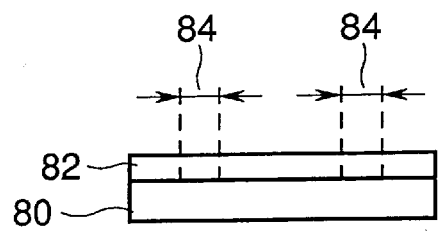

Referring to FIGS. 25A and 25B, the ultraviolet-curable polymer layer 82 is cured by exposure to ultraviolet light through a mask (not visible) that exposes only a spiral portion 84 in the desired location of the spiral groove 22. The same exposure conditions can be used as in the sixth embodiment (100 mJ/cm$^2$ to 600 mJ/cm$^2$).

Figure 26A:
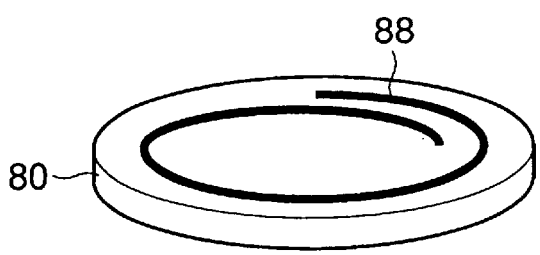
Figure 26B:
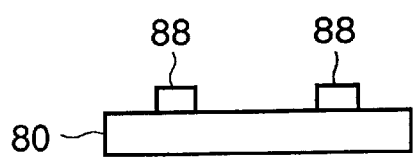

Referring to FIGS. 26A and 26B, the polymer layer 82 is developed in, for example, a 0.5% aqueous solution of sodium carbonate, removing the uncured portion and leaving a dummy fiber 88.

Figure 27A:
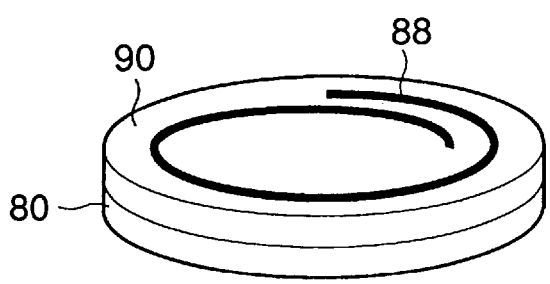
Figure 27B:
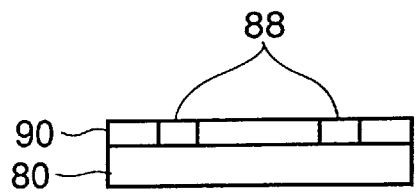

Referring to FIGS. 27A and 27B, the substrate 80 is now covered with a layer of protective material such as Desolite. The material is applied in a liquid form, filling the space around the dummy fiber 88 up to a level substantially even with the upper surface of the dummy fiber 88. The upper surface of the dummy fiber 88 is wiped clean so that none of the protective material remains on this surface; then the protective material is cured to form a protective layer 90. Any of this protective layer 90 that is unintentionally left on the upper surface of the dummy fiber 88 is removed by abrasion.

If Desolite is used, the protective layer 90 can be cured by exposure to ultraviolet light. The protective layer 90 can be formed from another polymer material, however, such as epoxy resin, acrylic resin, polyurethane acrylate, or the like.

Figure 28A:
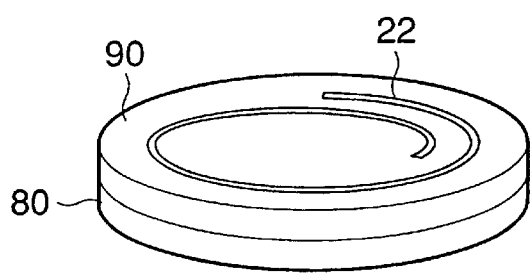
Figure 28B:
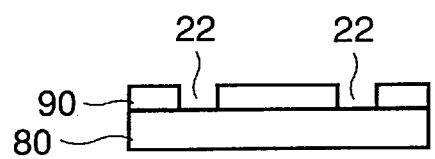

Referring to FIGS. 28A and 28B, the fiber holder 10 is completed by removing the dummy fiber 88 to form the spiral groove 22. The dummy fiber 88 can be removed by dipping the fiber holder 10 in a sodium hydroxide solution for a few minutes, then peeling the dummy fiber away from the substrate 80. The concentration of the sodium hydroxide solution should be on the order of a few percent.

Figure 29A:
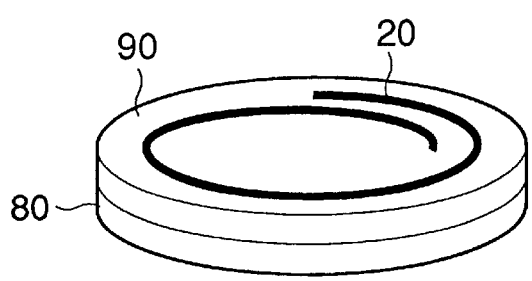
Figure 29B:
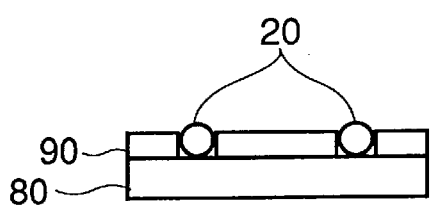
Figure 30A:
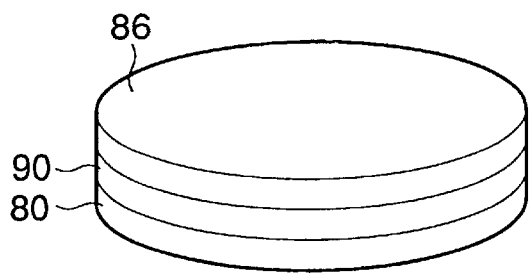
Figure 30B:
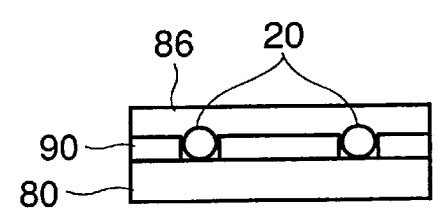

Referring to FIGS. 29A and 29B, the photosensitive optical fiber 20 is placed in the spiral groove 22, and an in-fiber Bragg grating is formed by the method of the first, second, or third embodiment. After formation of the in-fiber Bragg grating, the photosensitive optical fiber 20 and protective layer 90 are covered with an upper protective layer 86 of, for example, Desolite, as shown in FIGS. 30A and 30B. As in the sixth embodiment, optical fiber connectors, or a fiber connector and a fiber terminator, can be attached to complete the optical filter module.

Figure 31A:
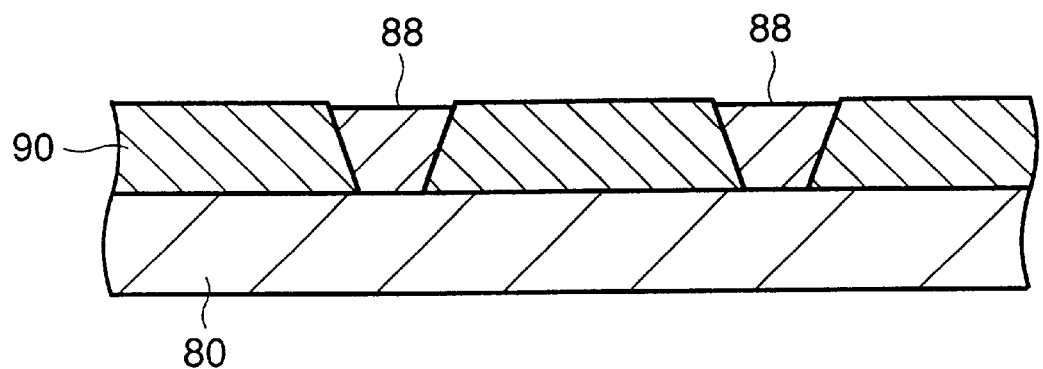
FIG. 31A is an enlarged sectional view illustrating a preferred shape of the dummy fiber in FIG. 27B.
Figure 31B:
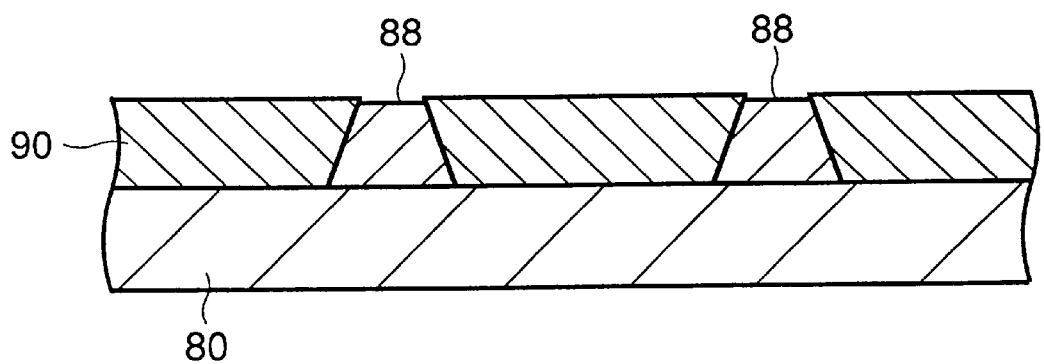
FIG. 31B is an enlarged sectional view illustrating a non-preferred shape of the dummy fiber in FIG. 27B.

To facilitate removal of the dummy fiber 88, the dummy fiber 88 is preferably given an inverted mesa shape as shown in FIG. 31A, the dummy fiber 88 thus being wider at the top than at the bottom. A mesa shape as shown in FIG. 31B should be avoided, because the dummy fiber 88 becomes more difficult to remove.

Like the sixth embodiment, the seventh embodiment creates a highly uniform spiral groove 22 with accurate dimensions, and is well suited for high-volume, automated production. Another advantage of the seventh embodiment is that both protective layers 86 and 90 can comprise a material, such as Desolite, that is manufactured for the express purpose of protecting optical fibers. The resulting package therefore offers excellent protection, not only from mechanical shock and vibration, but also from humidity and corrosion.

Next, an eighth embodiment will be described. The eighth embodiment adds a protective underlayer to the fiber holder 10.

Figure 32A:
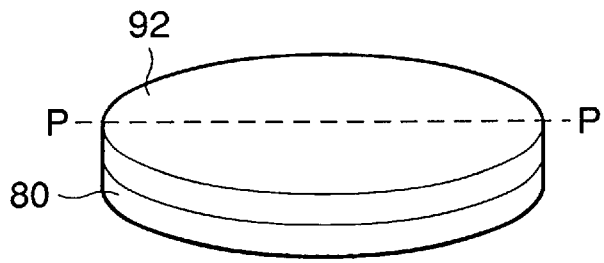
FIGS. 32A, 33A, 34A, 35A, 36A, 37A, 38A, and 39A are perspective views illustrating steps in still another novel method of manufacturing an optical filter.
Figure 32B:
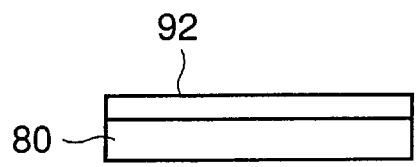
FIGS. 32B, 33B, 34B, 35B, 36B, 37B, 38B, and 39B are sectional views of the steps in FIGS. 32A, 33A, 34A, 35A, 36A, 37A, 38A, and 39A.

FIG. 32A is a perspective view illustrating a first step in the fabrication of the fiber holder 10 in the eighth embodiment. FIG. 32B is a sectional view through line P—P in FIG. 32A. FIGS. 33A to 39A show similar perspective views of subsequent fabrication steps, and FIGS. 33B to 39B show corresponding sectional views.

Referring to FIGS. 32A and 32B, the ceramic substrate 80 is first covered with a suitable ultraviolet-curable polymer material, which need not be a photoresist. This material is cured by exposure to ultraviolet light to form a protective underlayer 92 on the substrate 80.

Figure 33A:
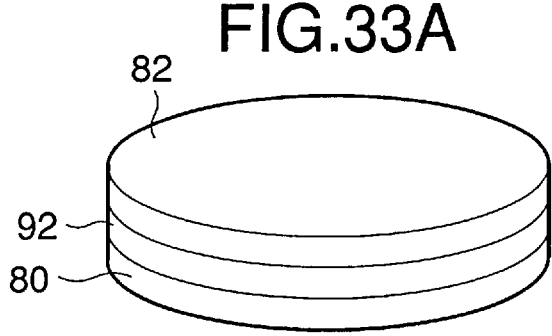
Figure 33B:
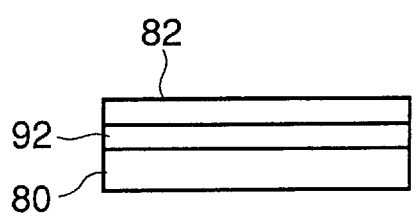
Figure 34A:
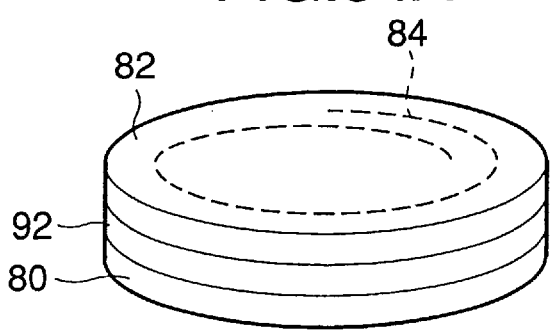
Figure 34B:
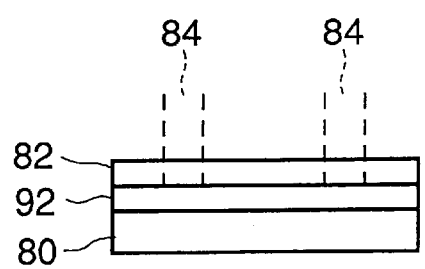
Figure 35A:
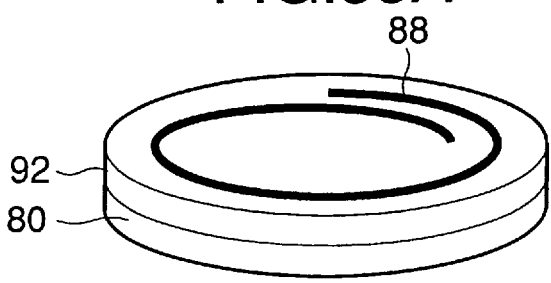
Figure 35B:
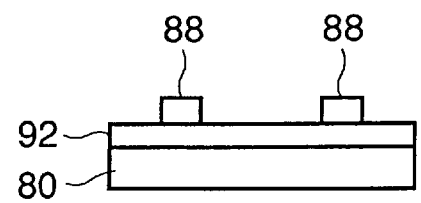
Figure 36A:
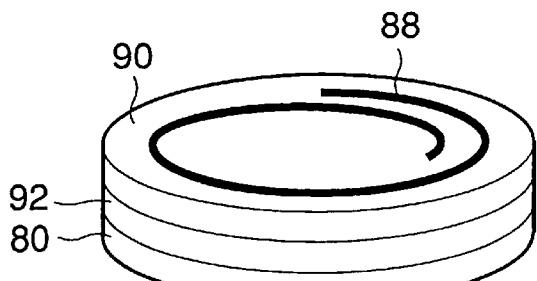
Figure 36B:
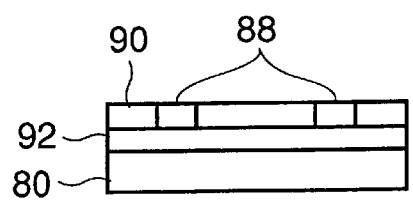
Figure 37A:
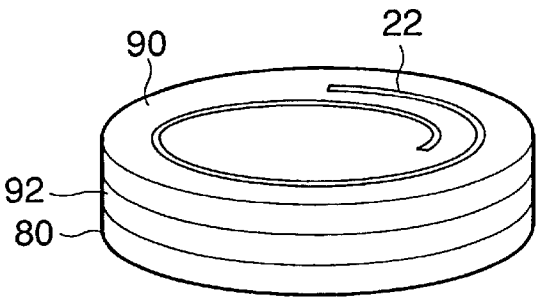
Figure 37B:
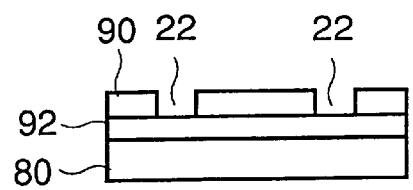
Figure 38A:
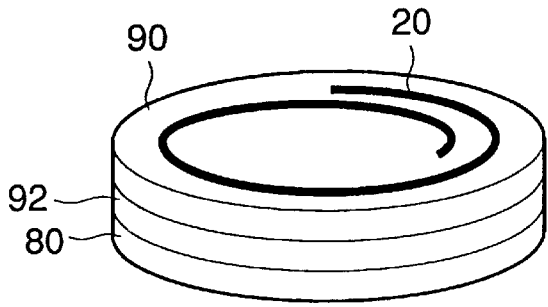
Figure 38B:
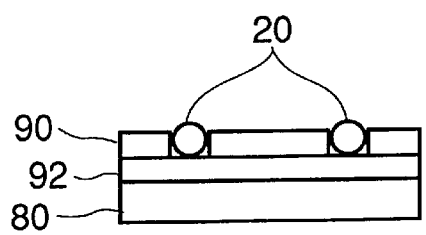
Figure 39A:
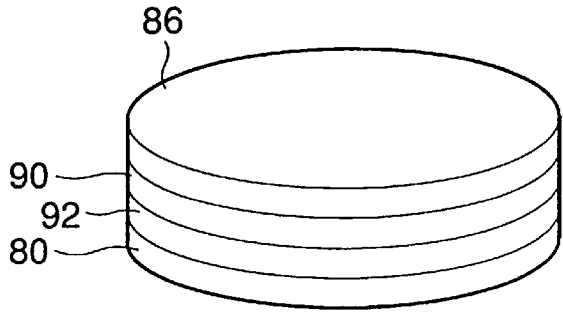
Figure 39B:
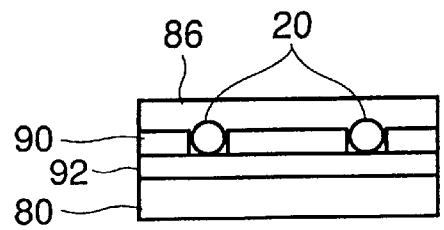

The succeeding steps are similar to the steps followed in the seventh embodiment. The protective underlayer 92 is covered by an ultraviolet-curable polymer layer 82 as shown in FIGS. 33A and 33B, which is patterned by photolithography (FIGS. 34A and 34B) to form a dummy fiber 88 as shown in FIGS. 35A and 35B. A protective layer 90 is formed as shown in FIGS. 36A and 36B, and the dummy fiber 88 is removed to leave a spiral groove 22 as shown in FIGS. 37A and 37B. The photosensitive optical fiber 20 is placed in the spiral groove 22 as shown in FIGS. 38A and 38B, an in-Bragg fiber grating is created, and an upper protective layer 86 is added as shown in FIGS. 39A and 39B.

In the eighth embodiment, the photosensitive optical fiber 20 is protected on all sides by suitable protective materials. The protective underlayer 92 and protective layer 90 protect the photosensitive optical fiber 20 during the formation of the in-fiber Bragg grating, as well as after the optical filter is packaged.

Figure 40A:
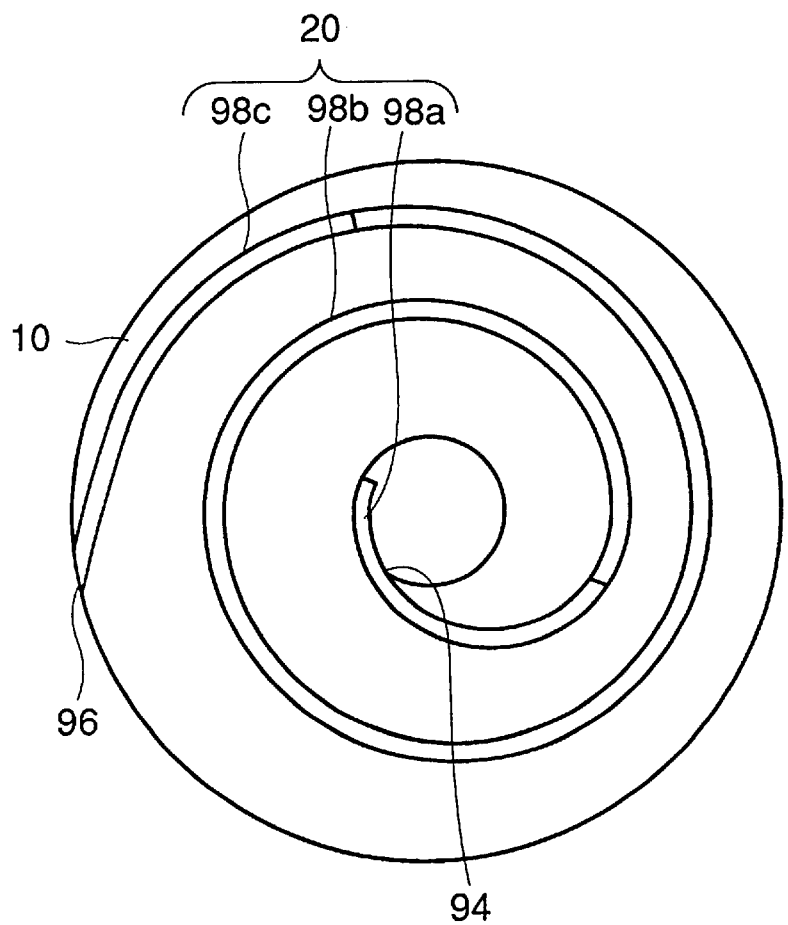
FIG. 40A is a plan view showing a variation of the invented fiber holder.
Figure 40B:
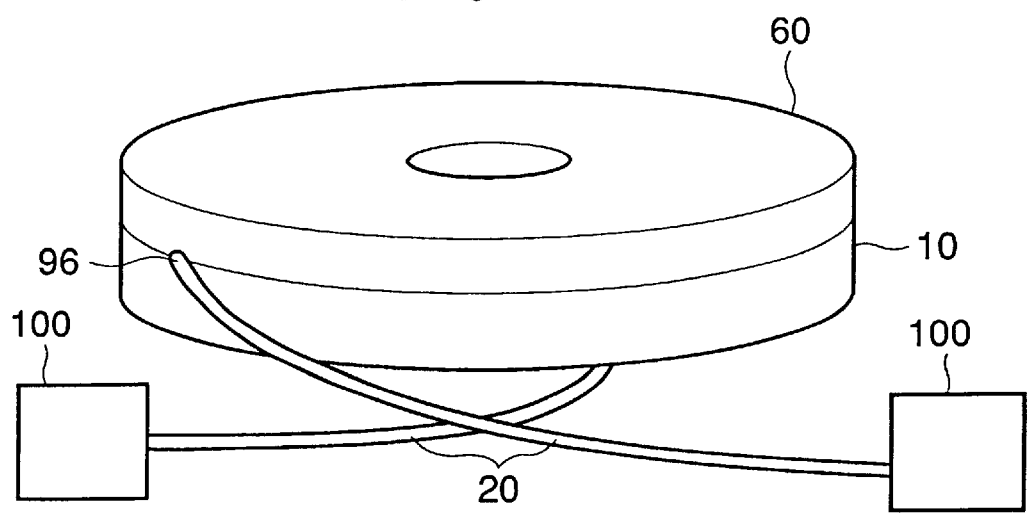
FIG. 40B is a perspective view of an optical filter module employing the fiber holder in FIG. 40A.

FIGS. 40A and 40B illustrate a variation of the preceding embodiments in which the fiber holder 10 and its cover have an annular shape. As shown in FIG. 40A, the photosensitive optical fiber 20 occupies a spiral groove that extends from an opening 94 at the inner perimeter of the annular fiber holder 10 (or its cover 60) to an opening 96 at the outer perimeter. The photosensitive optical fiber 20 is divided into three segments 98a, 98b, and 98c. An in-fiber Bragg grating is formed only in the middle segment 98b; the inner segment 98a and outer segment 98c are not scanned by the ultraviolet beam. The two ends of the photosensitive optical fiber 20 extend through the openings 94 and 96 so that optical fiber connectors 100, or an optical fiber connector and a fiber terminator, can be attached as shown in FIG. 40B.

FIG. 40B shows a cover 60 of the type described in the fourth embodiment, although with an annular shape. The fifth, sixth, seventh, and eighth embodiments can also employ an annular fiber holder 10, with protective layers of a similar annular shape.

Other variations are also possible in the preceding embodiments. For example, the second and third embodiments can be combined by varying both the pulse repetition rate of the laser light source 30 and the rotational speed of the rotating stage 14. Also, the fiber holder 10 and phase mask 12 need not be circular discs; they may have any shapes that provide flat surfaces on which a circular spiral groove and a circular spiral diffraction grating can be formed.

Those skilled in the art will recognize that further variations are possible within the scope of the invention as claimed below.

What is claimed is:

1. A method of manufacturing an optical filter, comprising the steps of:
   securing an optical fiber having a photosensitive core in a flat spiral arrangement on an upper surface of a fiber holder;
   placing a phase mask having a lower surface facing said optical fiber parallel to the upper surface of said fiber holder, the lower surface of said phase mask having a spiral diffraction grating paralleling the spiral arrangement of said optical fiber; and
   exposing said optical fiber to ultraviolet light through said phase mask, thereby creating a periodic refractive-index modulation in the photosensitive core of said optical fiber.

2. The method of claim 1, wherein said ultraviolet light is generated as a beam, further comprising the steps of:
   rotating said fiber holder around a center of the spiral arrangement of said optical fiber; and
   scanning said beam in a radial direction of said fiber holder.

3. The method of claim 2, further comprising the step of synchronizing a scanning rate of said beam with a rotational speed of said fiber holder.

4. The method of claim 2, further comprising the step of varying an amount of ultraviolet light to which said optical fiber is exposed according to position on the upper surface of said fiber holder.

5. The method of claim 4, wherein the upper surface of said fiber holder is concentrically divided into three zones, and said step of varying further comprises the steps of:
   gradually increasing said amount of ultraviolet light as said beam scans across a first one of said three zones;
   holding said amount of ultraviolet light constant as said beam scans across a second one of said three zones; and
   gradually decreasing said amount of ultraviolet light as said beam scans across a third one of said three zones.

6. The method of claim 4, wherein said beam comprises pulses of ultraviolet light, and said step of varying is carried out by variable repetition-rate control of said pulses.

7. The method of claim 4, wherein said step of varying is carried out by variable attenuation of said beam.

8. The method of claim 4, wherein said step of varying is carried out by variable rotational-speed control of said fiber holder.

9. The method of claim 8, wherein the upper surface of said fiber holder is concentrically divided into three zones, and said step of varying further comprises the steps of:
   gradually decreasing said rotational speed as said beam scans across a first one of said three zones;
   holding said rotational speed substantially constant as said beam scans across a second one of said three zones; and
   gradually increasing said rotational speed as said beam scans across a third one of said three zones.

10. The method of claim 1, further comprising the step of packaging said optical fiber between said fiber holder and a cover, after said step of exposing.

11. The method of claim 10, wherein:
    the upper surface of said fiber holder has a spiral groove for holding said optical fiber; and
    said cover has a lower surface with a spiral groove for holding said optical fiber.

12. The method of claim 10, wherein said fiber holder and said cover are made of a material selected from among aluminum oxide, titanium oxide, aluminum nitride, and boron nitride.

13. The method of claim 10, wherein said fiber holder and said cover have coefficients of thermal expansion not less than $10^{-7}/°$ C. and not greater than $10^{-6}/°$ C.

14. The method of claim 10, further comprising the step of fastening said cover to said fiber holder with an adhesive after said step of exposing.

15. The method of claim 14, wherein said fiber holder has a groove for holding excess portions of said adhesive.

16. The method of claim 14, wherein said adhesive is an epoxy adhesive.

17. The method of claim 10, further comprising the step of forming said cover by applying a protective layer to the upper surface of said fiber holder after said step of exposing.

18. The method of claim 17, wherein said fiber holder and said cover are made of a material selected from among aluminum oxide, titanium oxide, aluminum nitride, and boron nitride.

19. The method of claim 17, wherein said fiber holder and said cover have coefficients of thermal expansion not less than $10^{-7}/°$ C. and not greater than $10^{-6}/°$ C.

20. The method of claim 1, wherein the upper surface of said fiber holder has a spiral groove for holding said optical fiber.

21. The method of claim 20, further comprising creating said fiber holder by the steps of:

coating a substrate with an ultraviolet-curable first polymer layer;

selectively exposing said first polymer layer to ultraviolet light, thereby curing said first polymer layer, leaving a spiral portion of said first polymer layer unexposed to said ultraviolet light and thus uncured; and removing the uncured spiral portion of said first polymer layer, thereby creating said spiral groove.

22. The method of claim 21, wherein said first polymer layer is an ultraviolet-curable dry-film photoresist.

23. The method of claim 21, further comprising the steps of:

coating said fiber holder and said optical fiber with an ultraviolet-curable second polymer layer, after said step of exposing; and curing said second polymer layer by exposure to ultraviolet light, thereby packaging said optical fiber between said fiber holder and said second polymer layer.

24. The method of claim 20, further comprising creating said fiber holder by the steps of:

coating a substrate with an ultraviolet-curable third polymer layer;

selectively exposing a spiral portion of said third polymer layer to ultraviolet light, thereby curing said spiral portion;

removing uncured portions of said third polymer layer from said substrate, thereby leaving said spiral portion of said third polymer layer as a dummy fiber on said substrate;

applying a protective layer to those parts of said substrate not covered by said dummy fiber; and removing said dummy fiber from said substrate, thereby forming said fiber holder.

25. The method of claim 24, wherein said dummy fiber has an inverted mesa shape.

26. The method of claim 24, wherein said third polymer layer is an ultraviolet-curable dry-film photoresist.

27. The method of claim 24, wherein said protective layer is an ultraviolet-curable polyurethane acrylate polymer layer.

28. The method of claim 24, further comprising the steps of:

applying an ultraviolet-curable fourth polymer layer to said fiber holder and said optical fiber after said step of exposing; and curing said fourth polymer layer by exposure to ultraviolet light, thereby packaging said optical fiber between said fiber holder and said fourth polymer layer.

29. The method of claim 24, further comprising the step of applying a protective underlayer to said substrate before said step of coating said substrate with said ultraviolet-curable third polymer layer.

30. The method of claim 1, wherein said phase mask comprises a plate transparent to ultraviolet light, said plate having a spiral pattern of periodic pits forming a spiral diffraction grating on one surface thereof.

31. The method of claim 30, wherein said pits are grouped along a path of said spiral pattern into a plurality of zones, the pits in different zones having different mutual spacings.

32. The method of claim 30, wherein said plate is made of quartz glass.

* * * * *